US012783925B2

(12) United States Patent
Kremer Garcia et al.

(10) Patent No.: US 12,783,925 B2
(45) Date of Patent: Nov. 3, 2026

(54) ARTIFICIALLY INTELLIGENT COMPILATION OF QUANTUM CIRCUITS

(71) Applicant: International Business Machines Corporation, Armonk, NY (US)

(72) Inventors: David Kremer Garcia, White Plains, NY (US); Ayushi R. Dubal, Madison, WI (US); Derek Wang, New York, NY (US); Elisa Doreen Bäumer, Zurich (CH); Arkopal Dutt, Somerville, MA (US); William Kirby, Cambridge, MA (US); Patrick Julian Tassilo Rall, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 19/007,973

(22) Filed: Jan. 2, 2025

(65) Prior Publication Data

US 2026/0187507 A1 Jul. 2, 2026

(51) Int. Cl.
*G06N 10/00* (2022.01)
*G06N 10/20* (2022.01)
*G06N 10/70* (2022.01)

(52) U.S. Cl.
CPC ............. *G06N 10/20* (2022.01); *G06N 10/70* (2022.01)

(58) Field of Classification Search
CPC ......... G06N 10/70; G06N 10/40; G06N 10/20
See application file for complete search history.

(56) References Cited

U.S. PATENT DOCUMENTS

| | | | | |
|---|---|---|---|---|
| 11,681,845 B2 * | 6/2023 | Flöther | G06N 10/20 716/135 |
| 12,050,965 B2 * | 7/2024 | Haah | G06N 10/00 |
| 12,197,836 B2 * | 1/2025 | Flöther | G06F 30/337 |
| 2021/0182723 A1 * | 6/2021 | Schmitz | G06F 11/3688 |
| 2021/0406755 A1 * | 12/2021 | Martiel | G06N 10/20 |
| 2022/0114468 A1 * | 4/2022 | Bravyi | G06N 10/20 |
| 2022/0237352 A1 * | 7/2022 | Flöther | G06N 10/00 |
| 2023/0186128 A1 * | 6/2023 | Bravyi | G06F 30/28 716/104 |

(Continued)

FOREIGN PATENT DOCUMENTS

CN 116301889 A 6/2023

OTHER PUBLICATIONS

Garcia et al., "Reinforcement Learning Based Quantum Circuits Synthesis", U.S. Appl. No. 18/524,142 dated Nov. 30, 2023, 45 pages.

(Continued)

*Primary Examiner* — Jonathan D Gibson
(74) *Attorney, Agent, or Firm* — Amin, Turocy & Watson, LLP

(57) ABSTRACT

Systems/techniques that facilitate artificially intelligent compilation of quantum circuits for quantum computing are provided. In various embodiments, a system can receive a quantum circuit. In various aspects, the system can synthesize, via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set.

20 Claims, 13 Drawing Sheets

(56) References Cited

U.S. PATENT DOCUMENTS

| | | | | |
|---|---|---|---|---|
| 2023/0325568 | A1* | 10/2023 | Flöther | G06N 3/094<br>716/135 |
| 2024/0037439 | A1* | 2/2024 | Werner | G06N 10/40 |
| 2025/0165221 | A1* | 5/2025 | Alexander | G06F 7/582 |
| 2025/0378362 | A1* | 12/2025 | Reagor | G06N 10/40 |
| 2026/0065122 | A1* | 3/2026 | Lackey | G06N 10/70 |

OTHER PUBLICATIONS

Cross et al. "Improved QLDPC Surgery: Logical Measurements and Bridging Codes" arXiv:2407.18393v3 [quant-ph] Nov. 1, 2024, 49 pages.

He et al, "Variational quantum compiling with double Q-learning", New Journal of Physics 23.3, 2021, 15 pages.

Kolle et al, "A Reinforcement Learning Environment for Directed Quantum Circuit Synthesis", arXiv:2401.07054v1 [quant-ph] Jan. 13, 2024, 12 pages.

Litinski et al. "A Game of Surface Codes: Large-Scale Quantum Computing with Lattice Surgery" arXiv:1808.02892v3 [quant-ph] Feb. 3, 2019, 37 pages.

Pllaha, et al, "Decomposition of Clifford Gates", 2021 IEEE Global Communications Conference (GLOBECOM), Feb. 5, 2021, 6 pages.

Rietsch, et al. "Unitary Synthesis of Clifford+T Circuits with Reinforcement Learning", arXiv:2404.14865v4 [quant-ph] Sep. 3, 2024, 12 pages.

Dubal et al., "Pauli Network Circuit Synthesis with Reinforcement Learning", arXiv, Mar. 18, 2025, 13 pages, doi: https://doi.org/10.48550/arXiv.2503.14448.

International Searching Authority, "Notification of Transmittal of the International Search Report and the Written Opinion of the International Searching Authority, or Declaration," Patent Cooperation Treaty, Mar. 27, 2026, 13 pages, International Application No. PCT/EP2025/088724.

Kremer et al., "Practical and efficient quantum circuit synthesis and transpiling with Reinforcement Learning", arXiv:2405.13196v2 [quant-ph], Feb. 26, 2025, 19 pages.

Stein et al., "Architectures for Heterogeneous Quantum Error Correction Codes", arXiv, Nov. 10, 2024, 13 pages, doi: https://doi.org/10.48550/arXiv.2411.03202.

Vandaele et al., "Optimal Hadamard gate count for Clifford+T synthesis of Pauli rotations sequences", arXiv, Apr. 9, 2023, 30 pages, doi: https://doi.org/10.48550/arXiv.2302.07040.

* cited by examiner

ARTIFICIALLY INTELLIGENT COMPILATION OF QUANTUM CIRCUITS

BACKGROUND

The subject disclosure relates to quantum circuit compilation, and more specifically to artificially intelligent compilation of quantum circuits.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, methods, or apparatuses that can facilitate artificially intelligent compilation of quantum circuits for quantum computing are described.

According to one or more embodiments, a system is provided. In various aspects, the system can comprise a memory that can store computer executable components. In various embodiments, the system can further comprise a processor that can execute the computer executable components stored in the memory. In various aspects, the computer executable components can comprise an access component that can receive a quantum circuit. In various embodiments, the computer executable components can further comprise a synthesis component that can synthesize, via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set.

In various aspects, the above-described system can be reformulated, reformatted, or otherwise implemented as a computer-implemented method or as a computer program product.

DETAILED DESCRIPTION

Figure 1:
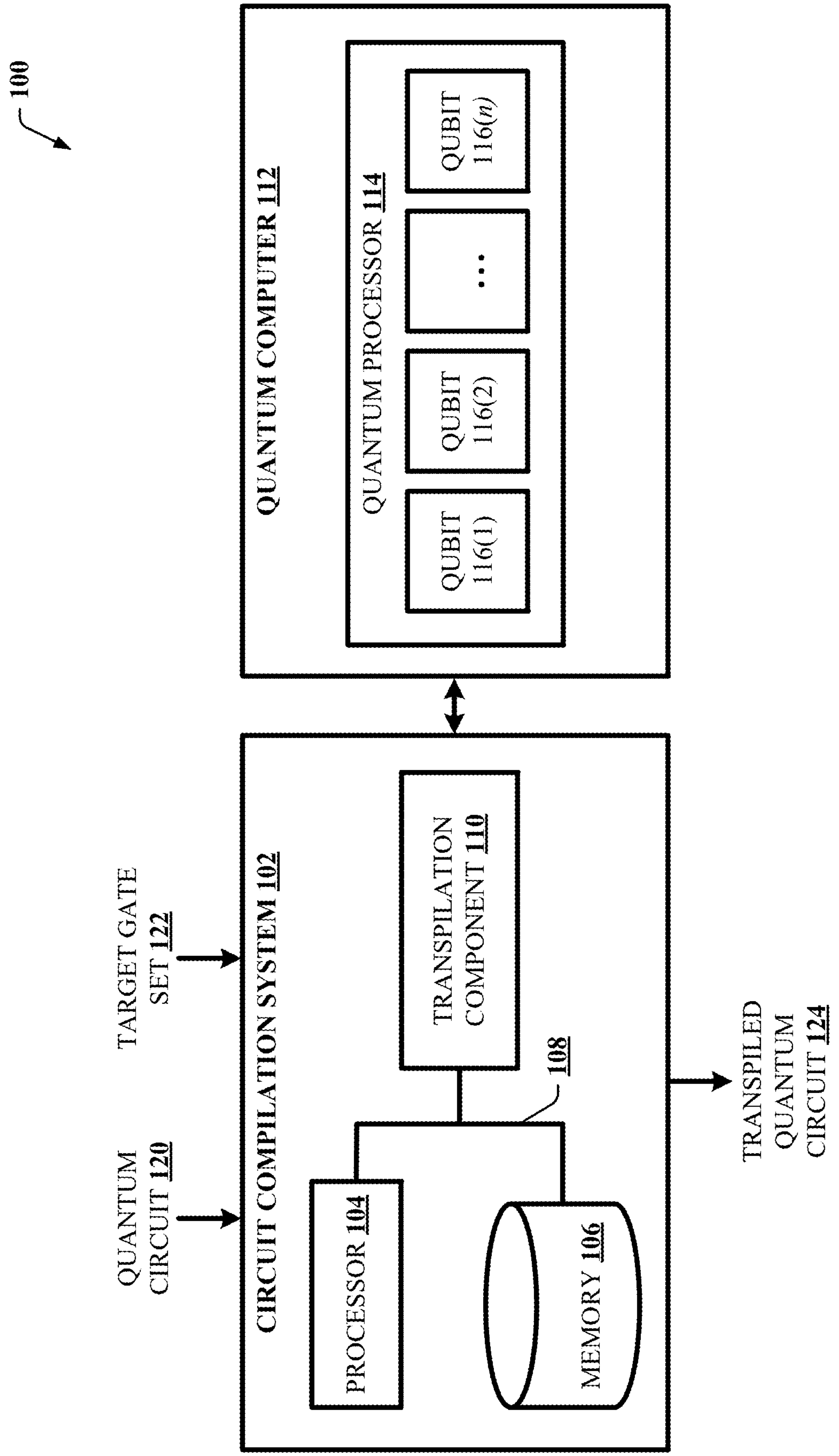
FIG. 1 illustrates a block diagram of an example, non-limiting system that facilitates artificially intelligent compilation of quantum circuits for quantum computing in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

According to one or more embodiments, a system is provided. In various aspects, the system can comprise a memory that can store computer executable components. In various embodiments, the system can further comprise a processor that can execute the computer executable components stored in the memory. In various aspects, the computer executable components can comprise an access component that can receive a quantum circuit. In various embodiments, the computer executable components can further comprise a synthesis component that can synthesize, via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set. Such embodiments of the system can provide a number of advantages, including improving synthesis or transpilation of quantum circuits to a target gate set, enabling circuit synthesis for fault-tolerant computing architectures, and reducing the sequence length of synthesized or transpiled circuits, thereby reducing overhead and implementation costs.

In one or more embodiments of the aforementioned system, the quantum circuit can be a Clifford circuit. In one or more embodiments of the aforementioned system, the quantum circuit can be a sequence of $$\exp\left(i\frac{\pi}{8}P\right)$$

gates. Suen embodiments of the system can provide the advantage of enabling circuit synthesis of Clifford circuits to near theoretically optimal-length sequences of Paulis and enabling synthesis of the complete set of Cliffords directly to the reduced set of Paulis supported by error correction code without significant overhead in the circuit size.

In one or more embodiments of the aforementioned system, the synthesis component can further implement the sequence of Pauli rotations of form exp(iθP) through fault-tolerant logical Pauli measurements in an error correction code, wherein the error correction code is a bivariate bicycle code. Such embodiments of the system can provide a number of advantages, including enabling circuit synthesis for fault-tolerant computing architectures such as the Gross code.

In one or more embodiments of the aforementioned system, the access component can further receive a target gate set that is supported by the quantum computing architecture and the error correction code, and wherein the synthesis component represents gates in the target gate set as bitstrings. Such embodiments of the system can provide the advantage of improving synthesis or transpilation of quantum circuits to a target gate set and enabling circuit synthesis for fault-tolerant computing architectures In one or more embodiments of the aforementioned system, the multi-qubit tensor product of Pauli matrices can act on a subset of qubits within the quantum circuit without constraints on weight or locality of the Pauli rotations. Such embodiments of the system can provide the advantage of greater flexibility in selecting Pauli rotations, enabling the generation of more efficient and compact quantum gate sequences.

In one or more embodiments of the aforementioned system, the at least one of the computer executable components can further execute the reinforcement learning model on the quantum circuit a plurality of times to optimize a length of the sequence of Pauli rotations. Such embodiments of the system can provide a number of advantages, including reducing the overall circuit depth, minimizing gate errors, and improving the efficiency of quantum circuit synthesis for target quantum operations.

In one or more embodiments of the aforementioned system, the at least one of the computer executable components can further train the reinforcement learning model, wherein training the reinforcement learning model can comprise: applying a penalty for circuit depth; and applying a reward for a correct circuit. Such embodiments of the system can provide a number of advantages, including reducing the overall circuit depth and ensuring the synthesized circuit accurately implements the desired quantum operation, thereby enhancing both efficiency and reliability.

In one or more embodiments of the aforementioned system, the at least one of the computer executable components can further train the reinforcement learning model in two or more difficulty stages. Such embodiments of the system can provide a number of advantages, including gradually improving the model's performance by allowing it to learn simpler tasks before learning more complex tasks, thereby enhancing training efficiency and overall accuracy for circuit synthesis.

In one or more embodiments of the aforementioned system, that at least one of the computer executable components can further iteratively execute the reinforcement learning model on the quantum circuit to iteratively determine a next Pauli rotation and a corresponding gate sequence number. Such embodiments of the system can provide a number of advantages, including enabling the dynamic refinement of the quantum circuit through step-by-step optimization, reducing errors in the gate sequence, and improving the overall efficiency and accuracy of the synthesized circuit.

In one or more embodiments of the aforementioned system, that at least one of the computer executable components can further execute the reinforcement learning model on the quantum circuit to produce a probability distribution over a set of Pauli rotations, and wherein the synthesis component selects a gate from the set of Pauli rotations with a highest probability in the probability distribution as the next Pauli rotation. Such embodiments of the system can provide a number of advantages, including reducing the overall circuit depth by selecting better suited next Pauli rotations and improving overall accuracy for circuit synthesis.

In one or more embodiments of the aforementioned system, that at least one of the computer executable components can further select, based on user input, a gate from the set of Pauli rotations by sampling from the probability distribution over the next Pauli rotation. Such embodiments of the system can provide a number of advantages, including enable customizable circuit synthesis based on desired preferences, reducing the overall circuit depth by selecting better suited next Pauli rotations and improving overall accuracy for circuit synthesis.

In one or more embodiments of the aforementioned system, that at least one of the computer executable components can further execute the reinforcement learning model on the quantum circuit to produce a probability distribution over a set of bits, and wherein the synthesis component selects bits with a probability greater than a defined threshold to encode the next Pauli rotation. Such embodiments of the system can provide a number of advantages, including reducing the overall circuit depth by selecting better suited encodings of the next Pauli rotations and improving overall accuracy for circuit synthesis.

In one or more embodiments of the aforementioned system, that at least one of the computer executable components can further select the reinforcement learning model based on the target gate set. Such embodiments of the system can provide the advantage of tailoring the model to the specific characteristics of the target gate set, thereby enhancing the efficiency and accuracy of the quantum circuit synthesis process.

In various aspects, the above-described system can be reformulated, reformatted, or otherwise implemented as a computer-implemented method or as a computer program product.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A quantum computer can be any suitable device that utilizes a qubit lattice (e.g., a plurality of superconducting qubits fabricated on one or more quantum substrates and exhibiting any suitable connection topology) for information processing. A quantum circuit can be a sequence of any suitable number of parallel or series quantum gates that can be executed on a quantum computer. A quantum gate can be a basic component of a quantum circuit that can change, alter, or otherwise affect the state of a qubit. Quantum gates can be combined in series via matrix multiplication or in parallel via tensor products. Quantum computers are inherently susceptible to noise, which disrupts the fragile quantum states of qubits and introduces errors. This noise becomes particularly problematic for quantum programs represented as circuits that are not compact or short, as their execution often leads to unreliable results. To make these programs executable, abstract quantum circuits must be translated into native operations specific to the target quantum device, considering its unique native operations and connectivity constraints. Such process of translating circuits is called transpilation. Transpilation and optimization of the resulting circuit from transpilation are part of a broader process called circuit compilation is a broader process that encompasses transpiling.

In quantum computing, transpiling is the process of adapting, rewriting, or rearranging a given quantum circuit so that it can be implemented on, performed on, executed on, or otherwise supported by the specific architecture of a given quantum computer. Compilation can include transpiling and optimizing the sequence of quantum gates to ensure the efficient execution of the circuit on a particular quantum device. Indeed, different quantum computers involve different qubit hardware (e.g., superconducting qubit hardware, quantum dot qubit hardware, spin qubit hardware) or different qubit coupling topologies (e.g., lattice coupling topologies, linear nearest neighbor coupling topologies, caterpillar coupling topologies). Thus, certain types of one-qubit or two-qubit quantum gates might be performable on the architectures of some quantum computers but not on the architectures of other quantum computers. Transpiling can be considered as the process of reformatting quantum circuits so as to be performable on desired quantum hardware. In other words, transpiling can be considered as translating a given quantum circuit from a language that is native to or otherwise understood by one quantum computer to another language that is native to or otherwise understood by another quantum computer. Specifically, transpiling can involve transforming the quantum circuit into a sequence of operations that can run on a specific quantum computer by adapting the quantum circuit to the native gate set and architecture of the quantum computer. Transpiling can further involve optimizing the sequence of operations to minimize errors and resource use.

Circuit synthesis can be considered as a foundational constituent task within transpiling. When given a quantum circuit, circuit synthesis involves finding a sequence of quantum gates that are native to, implementable on, or otherwise supported by the architecture of a particular quantum computer, where that sequence of gates is functionally equivalent to (e.g., performs the same overall quantum state transformation as) the given quantum circuit. That is, circuit synthesis can be considered as the process of translating the given quantum circuit into a language that is native to or otherwise understood by a particular quantum computer.

One approach to overcoming noise is the development of fault-tolerant quantum computers. Fault-tolerant quantum computers can typically rely on error correction codes. For example, fault-tolerant quantum computers can rely on bivariate bicycle codes, such as the gross code, to group qubits in a way that enables error correction, but they require the logical operations to be transpiled into operations supported by the error correction code. Specifically, Clifford and T gates must be compiled into native measurement-based operations that the Gross code can support. The gross code is a quantum low-density parity check (qLDPC) error correction code that uses long-range connectivity to achieve low qubit overhead. Pauli-based computation is another method that converts Clifford gates into sequences of $$\exp\left(i\frac{\pi}{4}P\right)$$

gates, which are then converted to Pauli product measurements.

However, implementing fault-tolerant operations on error-corrected quantum computers introduces significant complexity. Transpiling circuits for these systems requires adapting logical operations to the error correction code's native operations. This is especially challenging because these operations differ from those of the noisy quantum hardware, requiring careful synthesis and optimization to ensure the fault-tolerant quantum circuit is both efficient and correct.

Existing techniques for circuit synthesis often rely on gate decomposition and optimization. Gate decomposition breaks down high-level gates, such as Clifford gates, into lower-level gates that can be directly implemented on the hardware. For instance, Clifford gates (H, S, CX) are often translated into sequences of $$\exp\left(i\frac{\pi}{4}P\right)$$

gates compatible with specific quantum devices. Brute-force decomposition is one method used to explore all possible native gate sequences. Circuit optimization then reduces the gate count, improving the efficiency of the synthesized circuit.

However, the existing techniques which facilitate circuit synthesis suffer from various disadvantages.

First, the gate count reduction achieved through optimization is often insufficient for more complex quantum circuits because the native operations required for error-corrected systems involve intricate decompositions. In error-corrected systems, operations must be mapped to a native gate set that may require decomposing higher-level gates into multiple lower-level gates, which increases the overall gate count and circuit depth. This decomposition process is computationally expensive and often results in an expanded circuit that may not be optimal in terms of gate efficiency or execution time. As a result, optimization techniques that aim to minimize the gate count may not be sufficient to address the increased complexity of these circuits, particularly when dealing with fault-tolerant architectures that require additional error-correction layers. For example, realizing logical operations, even Clifford gates, on error-corrected codes such as the gross code is particularly challenging due to the complexity of mapping high-level gates to the native operations supported by the code. The gross code requires the use of multiple physical qubits to represent a single logical qubit, and implementing logical gates often involves intricate sequences of native operations that must be carefully orchestrated to preserve error correction.

Second, brute-force gate decomposition, though thorough, is computationally expensive and inefficient. It requires breaking down every possible gate into native gates, resulting in a large number of operations that make the method impractical for large or complex quantum circuits. The large computational cost and the need to process all possible decompositions hinder the scalability of this approach, especially when dealing with fault-tolerant or error-corrected quantum circuits. The excessive computational resources needed for brute-force decomposition makes this method impractical for large or fault-tolerant quantum systems. As the scale of quantum circuits increases, brute-force decomposition becomes an even greater bottleneck, limiting the scalability of this approach for more advanced quantum applications.

The various techniques described herein can help to address or ameliorate various of the above-described technical problems that plague existing techniques for facilitating circuit synthesis. In particular, the various techniques described herein can leverage artificial intelligence and reinforcement learning so as to help solve such technical problems.

Specifically, when given a quantum circuit and a target gate set, various embodiments described herein can involve training an artificial intelligence model (e.g., a neural network) with reinforcement learning so as to intelligently synthesize the quantum circuit into a sequence of Pauli rotations that is supported by the target gate set (e.g., can be implemented using the target gate set).

In some cases, the sequence of Pauli rotations can be implemented through fault-tolerant logical Pauli measurements in an error correction code, wherein the fault-tolerant logical Pauli measurements are facilitated by a probe of ancillary qubits.

A Pauli rotation is a quantum gate of the form $\exp(i\theta P)$, where P is a multi-qubit tensor product of Pauli matrices, and $\theta$ is a real number representing the rotation angle. As described herein, the rotation angle $\theta$ takes the value of $$\frac{\pi}{4},$$

though other angles may be used depending on the specific application, such as in error correction codes or specific quantum algorithms. A Pauli rotation can apply a phase shift to a qubit or multiple qubits on which it acts, with the phase determined by the angle $\theta$ and the Pauli operator P.

In various aspects, the target gate set can be the native gate set of a particular quantum computing architecture on which the quantum circuit is to be executed on. In some cases, the target gate set can be a gate set that is supported by the particular quantum computing architecture and an error correction code that the quantum computing architecture implements. In other instances, the target gate set can be any suitable gate set that can allow the quantum circuit to be executed on a particular quantum computing architecture.

In various aspects, reinforcement learning can be utilized to map or otherwise extract heretofore unknown or unseeable patterns or correlations between the characteristics or properties of the given quantum circuit and the target gate set. In still other words, the reinforcement learning model can be able to predict or infer a sequence of Pauli rotations that is functionally equivalent to the quantum circuit and also supported by the target gate set (e.g., supported by the quantum computing architecture and/or an error correction code). Thus, various embodiments described herein can consume significantly less time with less implementation costs than existing techniques for synthesizing quantum circuits for fault-tolerant quantum computing.

Accordingly, various embodiments described herein can be considered as concrete technical improvements in quantum circuit transpilation.

Various embodiments described herein can be considered as a computerized tool (e.g., any suitable combination of computer-executable hardware or computer-executable software) that can facilitate artificially intelligent compilation of quantum circuits for quantum computing. In various aspects, such a computerized tool can comprise an access component, a synthesis component, or a training component.

In various embodiments, there can be a quantum computer. In various aspects, the quantum computer can comprise any suitable number of qubits. In various instances, such qubits can exhibit any suitable structures, constructions, or architectures (e.g., can be superconducting qubits, spin qubits, or quantum dots). In various cases, the qubits of the quantum computer can be arranged or connected according to any suitable coupling topology.

In various embodiments, there can be a quantum circuit. In various aspects, the quantum circuit can be composed or otherwise made up of any suitable quantum gates (e.g., single-qubit gates, or two-qubit entangling gates). In various cases, the quantum circuit can be currently formatted in a fashion that is not implementable on the quantum computer (e.g., the quantum circuit might include an entangling gate between two qubits that are not coupled together in the coupling topology of the quantum computer). In other words, the quantum circuit can be outside of design constraints of an architecture of a quantum computer (e.g., outside of design constraints of an error correction code used by the quantum computer).

In various aspects, it can be desired to synthesize or transpile the quantum circuit so that it is implementable on the quantum computer. In some cases, it can be desired to synthesize or transpile the quantum circuit so that it is implementable on the quantum computer and an error correction code that the quantum computer implements. As described herein, the computerized tool can facilitate such synthesis or transpilation.

In various embodiments, the access component of the computerized tool can electronically access, via any suitable wired or wireless electronic connections, the quantum computer. In various instances, the access component can further access or otherwise receive, retrieve, or import from any suitable source the quantum circuit. For example, the access component can obtain the quantum circuit from any suitable centralized or decentralized data structure (e.g., graph data structure, relational data structure, hybrid data structure), whether remote from or local to the access component. In any case, the access component can access the quantum computer or the quantum circuit, such that other components of the computerized tool can electronically interact with (e.g., power-up, power-down, initialize, control) the quantum computer or can electronically interact with (e.g., read, write, edit, copy, manipulate, execute) the quantum circuit.

In various embodiments, the synthesis component can electronically store, maintain, control, or otherwise access a reinforcement learning model.

In various aspects, the reinforcement learning model can exhibit any suitable internal architecture. In various instances, the reinforcement learning model can be a deep learning neural network. For example, the reinforcement learning model can include any suitable numbers of any suitable types of layers (e.g., input layer, one or more hidden layers, output layer, any of which can be convolutional layers, dense layers, long short-term memory (LSTM) layers, non-linearity layers, pooling layers, batch normalization layers, or padding layers). As another example, the reinforcement learning model can include any suitable numbers of neurons in various layers (e.g., different layers can have the same or different numbers of neurons as each other). As yet another example, the reinforcement learning model can include any suitable activation functions (e.g., softmax, sigmoid, hyperbolic tangent, rectified linear unit) in various neurons (e.g., different neurons can have the same or different activation functions as each other). As still another example, the reinforcement learning model can include any suitable interneuron connections or interlayer connections (e.g., forward connections, skip connections, recurrent connections).

Regardless of its specific internal architecture, the reinforcement learning model can be configured as a circuit synthesizer that is associated with the quantum computer. That is, the reinforcement learning model can be configured to receive as input any quantum circuit and to determine as output a sequence of Pauli rotations that is functionally equivalent to the quantum circuit and is implementable on the quantum computer (e.g., or implementable with the target gate set). Accordingly, the synthesis component can electronically execute the reinforcement learning model on the quantum circuit and target gate set, and such execution can yield a sequence of Pauli rotations. More specifically, the synthesis component can feed the quantum circuit to the input layer of the reinforcement learning model, the quantum circuit can complete a forward pass through the one or more hidden layers of the reinforcement learning model, and the output layer of the reinforcement learning model can determine the sequence of Pauli rotations based on activations provided by the one or more hidden layers of the reinforcement learning model.

In various embodiments, the training component of the computerized tool can train the reinforcement learning model to synthesize the quantum circuit via reinforcement learning. Specifically, the training component can apply a penalty for each iterative step in determining the sequence of Pauli rotations. In other words, for each Pauli rotation in the sequence of Pauli rotations, the training component can apply a penalty to encourage shorter sequences, and thus shorter transpiled circuits. In other cases, the training component can apply a reward for determining a correct sequence of Pauli rotations. That is, the training component can apply a reward for determining a sequence of Pauli rotations that is functionally equivalent to the quantum circuit. Additionally, the training component can train the reinforcement learning model in two or more difficulty stages. For example, the training component can train the reinforcement learning model in progressively increasing difficulty stages as the success rate of the reinforcement learning model increases. In some cases, the difficulty of each stage can be assigned based on the known number of gates required to synthesize the quantum circuit. For instance, quantum circuits that are known to require a lower number of gates in the synthesized circuit can be used to train the reinforcement learning model in a lower difficulty stage. Conversely, quantum circuits that are known to require a higher number of gates in the synthesized circuit can be used to train the reinforcement learning model in a higher difficulty stage. Accordingly, once the reinforcement learning model achieves a desired success rate in the lower difficulty stage, the training component can proceed to training the reinforcement learning model with the quantum circuits assigned to the higher difficulty stage.

In various embodiments, the synthesis component can leverage the reinforcement learning model as follows. In various cases, the synthesis component can execute that reinforcement learning model on the quantum circuit, and such execution can yield a next Pauli rotation in a sequence of Pauli rotations. In various aspects, the synthesis component can repeat this procedure until a sequence of Pauli rotations is found that is functionally equivalent to the quantum circuit. In other words, the reinforcement learning model can determine the sequence of Pauli rotations in an iterative synthesis process. Specifically, the synthesis component can iteratively execute the reinforcement learning model on the quantum circuit to iteratively determine a next Pauli rotation in the sequence of Pauli rotations until the sequence of Pauli rotations is equivalent to the quantum circuit. Furthermore, the synthesis component can optimize the length of the sequence of Pauli rotations by executing multiple trials to synthesize the quantum circuit into the sequence of Pauli rotations (e.g., executing the reinforcement learning model on the quantum circuit to determine a sequence of Pauli rotations a multitude of times).

In this way, the quantum circuit can be synthesized or transpiled without excessive consumption of time and can result in shorter synthesized circuits than that of existing methods. Indeed, various embodiments described herein can be considered as compiling (e.g., as synthesizing and optimizing) quantum circuits in an intelligent manner (as determined by the reinforcement learning model) rather than in a brute-force manner. Thus, the number of gates in the synthesized circuit can be reduced, and thus reduce implementation costs of the synthesized circuit. Additionally, the quantum circuit can be synthesized or transpiled to be implementable on any target gate set received as input. For example, this can enable the quantum circuit to be synthesized or transpiled to also be implementable on an error correction code that the quantum computer uses. Further, the reinforcement learning of various embodiments described herein can be considered as optimizing the synthesized circuit (in addition to learning circuit synthesis) to reduce the length of the synthesized circuit. Thus, implementation costs can be reduced and the various embodiments described herein can be scaled to transpile larger or more complex quantum circuits.

In various embodiments, the execution component of the computerized tool can take any suitable electronic actions, based on the synthesized or transpiled version of the quantum circuit. As a non-limiting example, the execution component can electronically command or instruct the quantum computer to execute or perform the synthesized or transpiled version of the quantum circuit. Accordingly, the execution component can electronically command or instruct the quantum computer to execute or otherwise perform the synthesized or transpiled version of the quantum circuit (e.g., can initialize the qubits of the quantum computer in any suitable fashion, can cause those initialized qubits to perform whatever sequence of quantum operations is called for by the synthesized or transpiled version of the quantum circuit, and can cause whatever resultant quantum states are taken on by the qubits of the quantum computer to be read or measured).

Note that, in order for circuit synthesis to be accurately or correctly performed, the herein-described reinforcement learning models should first undergo training. In various cases, the computerized tool can train such deep learning neural networks using reinforcement learning or any other suitable training paradigms (e.g., via supervised training or unsupervised training).

Various embodiments described herein can be employed to use hardware or software to solve problems that are highly technical in nature (e.g., to facilitate artificially intelligent compilation of quantum circuits for quantum computing), that are not abstract and that cannot be performed as a set of mental acts by a human. Further, some of the processes performed can be performed by a specialized computer (e.g., quantum computers comprising tangible qubits that can execute or implement quantum circuits; reinforcement learning neural networks that are configured to synthesize a quantum circuit into a sequence of Pauli rotations).

In various aspects, some defined tasks associated with various embodiments described herein can include: receiving, by a device operatively coupled to a processor, a quantum circuit; and synthesizing, by the device and via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set. In various cases, the quantum circuit can be a Clifford circuit or a sequence of $$\exp\left(i\frac{\pi}{8}P\right)$$

gates. In some instances, such defined tasks can further include: implementing, by the device, the sequence of Pauli rotations of form exp(iθP) through fault-tolerant logical Pauli measurements in an error correction code, wherein the error correction code is a bivariate bicycle code. In various cases, such defined tasks can further include: receiving, by the device, a target gate set that is supported by the quantum computing architecture and the error correction code, and wherein the synthesis component represents gates in the target gate set as bitstrings. In various instances, the multi-qubit tensor product of Pauli matrices can act on a subset of qubits within the quantum circuit without constraints on weight or locality of the Pauli rotations. In various aspects, such defined tasks can further include: executing, by the device, the reinforcement learning model on the quantum circuit a plurality of times to optimize a length of the sequence of Pauli rotations. In various aspects, such defined tasks can further include: training, by the device, the reinforcement learning model, wherein training the reinforcement learning model comprises: applying a penalty for circuit depth; and applying a reward for a correct circuit. In various cases, such defined tasks can further include: training, by the device, the reinforcement learning model in two or more difficulty stages. In various instances, such defined tasks can further include: iteratively executing, by the device, the reinforcement learning model on the quantum circuit to iteratively determine a next Pauli rotation and a corresponding gate sequence number. In various instances, such defined tasks can further include: executing, by the device, the reinforcement learning model on the quantum circuit to produce a probability distribution over a set of Pauli rotations, and wherein the synthesis component selects a gate from the set of Pauli rotations with a highest probability in the probability distribution as the next Pauli rotation. In various cases, such defined tasks can further include: selecting, by the device and based on user input, a gate from the set of Pauli rotations by sampling from the probability distribution over the next Pauli rotation. In various aspects, such defined tasks can further include: executing, by the device, the reinforcement learning model on the quantum circuit to produce a probability distribution over a set of bits, and wherein the synthesis component selects bits with a probability greater than a defined threshold to encode the next Pauli rotation. In various cases, such defined tasks can further include: selecting, by the device, the reinforcement learning model based on the target gate set.

Neither the human mind nor a human with pen and paper can: electronically receive a quantum circuit and a target gate set; electronically execute a reinforcement learning model on that quantum circuit so as to determine an equivalent sequence of Pauli rotations that is implementable on the target gate set; electronically train the reinforcement learning model by applying rewards or penalties to optimize the length of the sequence of Pauli rotations; select quantum circuits to train the reinforcement learning mode for synthesis or transpilation in order of increasing difficulty; and electronically cause the synthesized or transpiled version of the quantum circuit to be executed or performed on the quantum computer. After all, a quantum computer is a specialized piece of computing hardware that utilizes physical qubits (e.g., superconducting qubits, such as transmons) to process information. Physical qubits cannot be implemented by the human mind or by a human with pen and paper. Moreover, a quantum circuit can be a sequence of quantum gates that can be executed on a quantum computer. Neither the human mind, nor a human with pen and paper, can transpile or otherwise manipulate quantum gates or execute quantum gates on physical qubits. Additionally, artificial neural networks are also inherently computerized constructs comprising specific software-oriented architectures (e.g., input layers, hidden layers, or output layers, any of which can be made up of trainable or non-trainable internal parameters such as convolutional layers or LSTM layers). Artificial neural networks cannot be trained or executed by the human mind, or by humans with mere pen and paper, in any reasonable or practicable way without computers. Also, the very field of quantum circuit transpilation is focused on electronically translating or reformatting quantum circuits so that they can be implementable or executable on specific quantum hardware. It would make no sense whatsoever to discuss the field of quantum circuit transpilation outside of a computing context. Therefore, a computerized tool that can facilitate circuit synthesis or transpilation via implementation of artificially intelligent circuit synthesis is inherently computerized and cannot be implemented in any sensible, practicable, or reasonable way without computers.

In various instances, one or more embodiments described herein can integrate the herein-described teachings into a practical application. As mentioned above, some existing techniques facilitate circuit synthesis or transpilation using brute-force decomposition. Unfortunately, such existing techniques suffer from various technical problems.

Specifically, such other existing techniques can consume excessive amounts of time and are prone to producing synthesized circuits with larger circuit depths (e.g., longer sequence lengths). Accordingly, the various embodiments described herein can be considered as solving, addressing, or otherwise ameliorating the technical problems that afflict such existing techniques. In particular, various embodiments described herein can include leveraging artificial intelligence and reinforcement learning so as to enhance or improve the efficacy of circuit synthesis or transpilation. More specifically, various embodiments described herein can involve utilizing a reinforcement learning model so as to intelligently learn to synthesize a quantum circuit into a sequence of Pauli rotations that are implementable on a target gate set. Contrast this with existing techniques that instead use brute-force decomposition resulting in long sequence lengths. Thus, by implementing intelligent circuit synthesis with reinforcement learning, various embodiments described herein can facilitate circuit synthesis or transpilation in less time, with more scalability, or with less implementation costs than existing techniques. In fact, these benefits were even experimentally verified by the present inventors, as described with respect to FIG. 9. For at least these reasons, various embodiments described herein constitute concrete and tangible technical improvements or technical effects in the field of quantum circuit compilation (or transpilation) and thus certainly qualify as useful and practical applications of computers.

It should be appreciated that the figures and the herein disclosure describe non-limiting examples of various embodiments. It should further be appreciated that the figures are not necessarily drawn to scale.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1300 illustrated at FIG. 13. For example, non-limiting system 100 can be associated with, such as accessible via, a computing environment 1300 described below with reference to FIG. 13, such that aspects of processing can be distributed between non-limiting system 100 and the computing environment 1300. In one or more described embodiments, computer and/or computing-based elements can be used in connection with implementing one or more of the systems, devices, components and/or computer-implemented operations shown and/or described in connection with FIG. 1 and/or with other figures described herein.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

FIG. 1 illustrates a block diagram of an example, non-limiting system 100 that can facilitate artificially intelligent compilation of quantum circuits for quantum computing in accordance with one or more embodiments described herein. As shown, a circuit compilation system 102 can be electronically integrated, via any suitable wired or wireless electronic connections, with a quantum computer 112.

Discussion turns briefly to processor 104, memory 106 and bus 108 of non-limiting system 100. For example, in one or more embodiments, non-limiting system 100 can comprise processor 104 (e.g., computer processing unit, microprocessor, classical processor, and/or like processor). In one or more embodiments, a component associated with non-limiting system 100, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, non-limiting system 100 can comprise a computer-readable memory (e.g., memory 106) that can be operably connected to processor 104. Memory 106 can store computer-executable instructions that, upon execution by processor 104, can cause processor 104 and/or one or more other components of non-limiting system 100 (e.g., transpilation component 110, access component 202, synthesis component 204, training component 206, and/or execution component 208) to perform one or more actions. In one or more embodiments, memory 106 can store computer-executable components (e.g., transpilation component 110, access component 202, synthesis component 204, training component 206, and/or execution component 208).

Non-limiting system 100 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, non-limiting system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of non-limiting system 100 can reside in the cloud, and/or can reside locally in a local computing environment (e.g., at a specified location(s)).

Figure 2:
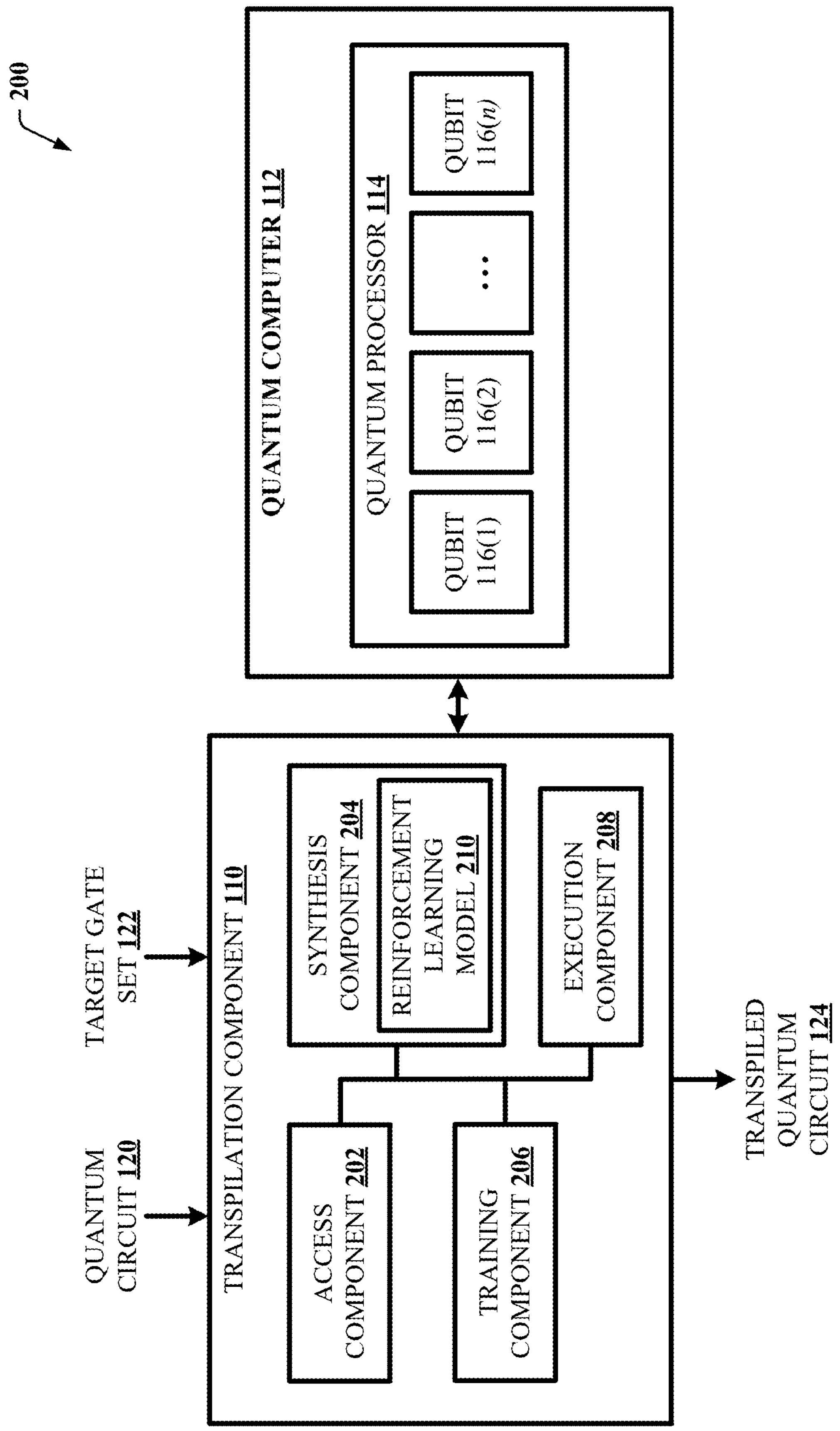
FIG. 2 illustrates another block diagram of an example, non-limiting system that facilitates artificially intelligent compilation of quantum circuits for quantum computing in accordance with one or more embodiments described herein.

In various embodiments, transpilation component 110 can comprise access component 202, synthesis component 204, training component 206, and execution component 208, as illustrated in FIG. 2.

As illustrated in FIG. 1, non-limiting system 100 can comprise circuit compilation system 102 and quantum computer 112. That is, the non-limiting system 100 can facilitate context-aware empirically optimized dynamical decoupling, in combination with employment of the quantum computer 112. Circuit compilation system 102 can be coupled (operatively, communicatively, electrically, and/or like function) to quantum computer 112.

In various embodiments, the quantum computer 112 can be any suitable quantum computing device or quantum computing hardware. In various aspects, the quantum computer 112 can comprise or otherwise include a quantum processor 114. The quantum processor 114 can comprise a set of qubits 116. In various instances, the set of qubits 116 can have n qubits for any suitable positive integer n: a qubit 116(1) to a qubit 116(*n*). In various cases, any of the set of qubits 116 can exhibit any suitable structure or architecture. As a non-limiting example, any of such qubits can exhibit a superconducting qubit architecture (e.g., such qubit can be constructed from any suitable number of Josephson junctions shunted by any suitable number of planar capacitor pads). As another non-limiting example, any of such qubits can exhibit a quantum dot architecture. As yet another non-limiting example, any of such qubits can exhibit a spin qubit architecture. In various aspects, different qubits of the set of qubits 116 can exhibit the same or different structures or architectures as each other. Although not explicitly shown in FIG. 1, the quantum computer 112 can comprise or otherwise be associated with any suitable hardware or software (e.g., real-time controllers implemented in field programmable gate arrays of the quantum computer 112) that can be used to initialize any of the set of qubits 116, or that can be used to perform any suitable quantum operations (e.g., quantum gates, qubit measurements, qubit idling) on the set of qubits 116.

In various embodiments, the quantum circuit 120 can be any suitable sequence of any suitable types of quantum gates (e.g., Pauli gates, Hadamard gates, Phase gates, entangling gates). As a non-limiting example, the quantum circuit 120 can be a Clifford circuit. As a non-limiting example, the quantum circuit 120 can be a Clifford circuit. A Clifford circuit is a type of quantum circuit composed of gates from the Clifford group, such as the Hadamard H, Phase S, and Controlled-NOT CX gates. Clifford circuits can be particularly significant in quantum error correction and stabilizer codes because they preserve the structure of Pauli operators under conjugation. Clifford circuits can also be essential in initializing quantum states, performing certain types of measurements, and implementing foundational building blocks for more complex quantum algorithms. Thus, the ability to effectively transpile and optimize Clifford circuits can be critical for enabling scalable and reliable quantum computations, ensuring that these operations are both resource-efficient and compatible with the constraints of fault-tolerant architectures. As another non-limiting example, the quantum circuit 120 can be a sequence of $$\exp\left(i\frac{\pi}{8}P\right)$$

gates. The $$\exp\left(i\frac{\pi}{8}P\right)$$

gates represent a rotation of qubits by an angle of π/8 around the axis specified by the Pauli operator P, where P can be any of the Pauli matrices (X, Y, Z) or a multi-qubit tensor product of these matrices. The exp(iπ/8P) gates are a specific type of Pauli rotation and are often used in quantum circuits to implement controlled rotations or to create specific quantum states. In this case, the $$\exp\left(i\frac{\pi}{8}P\right)$$

of the operator P, and can introduce a controlled phase shift based on the value of π/8. These rotations can be used in various quantum algorithms to enhance the precision of quantum state manipulations, such as in quantum phase estimation or for constructing gates in fault-tolerant quantum computing schemes, making them useful in highly sensitive quantum computations where precise quantum state control is essential.

In various instances, the quantum circuit 120 can be currently or presently formatted so as to not be implementable, executable, or performable on the quantum computer 112. In other words, the quantum circuit 120 can specify one or more quantum gates that cannot be performed by the hardware of the quantum computer 112. In still other words, one or more quantum gates of the quantum circuit 120 can be considered as failing to fit within or comply with any suitable design constraints associated with the architecture (e.g., with the coupling topology, with the error correction code) of the quantum computer 112. In some cases, it can be physically or theoretically impossible to execute or perform the quantum circuit 120 on the architecture of the quantum computer 112. In such situations, the quantum circuit 120 can certainly be considered as not implementable on, or as falling outside of design constraints of, the architecture of the quantum computer 112. However, in other cases, it can be physically or theoretically possible to execute or perform the quantum circuit 120 on the architecture of the quantum computer 112, but such execution or performance can be exceedingly inconvenient or burdensome. Thus, in such situations, the quantum circuit 120 can also be considered as not implementable on, or as falling outside of design constraints of, the architecture of the quantum computer 112.

As a non-limiting example, suppose that the quantum circuit 120 specifies or includes an entangling gate between a qubit A and a qubit B of the quantum computer 112, where the qubit A and the qubit B are not coupled together. Further suppose that the coupling topology of the quantum computer 112 is such that there is no possible combination of SWAP gates that could ever cause the logical state of the qubit A and the logical state of the qubit B to occupy two qubits of the quantum computer 112 that are coupled together. In such case, it can be impossible to perform or execute the quantum circuit 120 as currently or presently formatted on the quantum computer 112. Thus, the quantum circuit 120 can be considered as falling outside of the design constraints of the architecture of the quantum computer 112. Now, instead suppose that the coupling topology of the quantum computer 112 is such that at least one combination of SWAP gates can cause the logical state of the qubit A and the logical state of the qubit B to occupy two qubits of the quantum computer 112 that are coupled together. In such case, it can be theoretically possible to perform or execute the quantum circuit 120 as currently or presently formatted on the quantum computer 112. However, such performance or execution would likely necessitate a complicated, convoluted, or otherwise burdensome arrangement of SWAP gates. Thus, notwithstanding being theoretically performable or executable, the quantum circuit 120 in such case can nevertheless be considered as falling outside of the design constraints of the architecture of the quantum computer 112.

As another non-limiting example, suppose that the quantum circuit 120 specifies or includes a logical CX gate between a logical qubit A and a logical qubit B of the quantum computer 112, where the qubit A and the qubit B are encoded using the gross code. Further suppose that the native gate set of the quantum computer 112 is measurement-based and requires sequences of Pauli rotations and measurements to implement the CX gate. If the error correction constraints of the gross code are such that the required sequence of operations for the logical CX gate introduces excessive overhead or cannot maintain the fault-tolerance threshold of the quantum computer 112, it can be impossible to perform or execute the quantum circuit 120 as currently or presently formatted on the quantum computer 112. Thus, the quantum circuit 120 can be considered as falling outside of the design constraints of the architecture of the quantum computer 112. Now, instead suppose that the constraints of the gross code allow for a theoretically valid implementation of the logical CX gate through a sequence of Pauli rotations and measurements. In such a case, it may be possible to perform or execute the quantum circuit 120 as currently or presently formatted on the quantum computer 112. However, if the required sequence of operations results in excessive resource use or error propagation due to the native gate decomposition, such performance or execution would likely necessitate a convoluted, burdensome, or otherwise impractical arrangement of operations. Thus, notwithstanding being theoretically performable or executable, the quantum circuit 120 in such a case can nevertheless be considered as falling outside of the design constraints of the architecture of the quantum computer 112.

Thus, in any case, it can be desirable to synthesize or transpile the quantum circuit 120 into a format that is supported by or executable on the architecture of the quantum computer 112. For example, it can be desirable to synthesize or transpile a Clifford circuit to a sequence of gates that are compatible with the quantum computing architecture of quantum computer 112 to ensure efficient execution, minimize circuit depth, improve fault tolerance, and reduce the overall error rate, enabling the quantum system to leverage error-correction schemes like the gross code for robust, large-scale computations. As another example, it can be desirable to synthesize or transpile a sequence of $$\exp\left(i\frac{\pi}{8}P\right)$$

gates to a format compatible with the quantum computing architecture of quantum computer 112 to improve gate efficiency, reduce circuit depth, enhance fault tolerance by minimizing noise accumulation, and enable more precise control over qubit states, thereby facilitating the implementation of complex quantum operations with fewer resources.

As described herein, the circuit compilation system 102 can facilitate such synthesis or transpilation. That is, circuit compilation system 102 can receive quantum circuit 120 as input and produce transpiled quantum circuit 124 as output.

In various embodiments, the transpilation component 110 can receive the quantum circuit 120 as input. In various instances, transpilation component 110 can also receive a target gate set 122. In various aspects, transpilation component 110 can synthesize the quantum circuit 120 to be implementable on target gate set 122 via a reinforcement learning model 210. That is, the transpiled quantum circuit 124 can be considered as the synthesized or transpiled version of the quantum circuit 120 that can be implementable with target gate set 122.

FIG. 2 illustrates another block diagram of an example, non-limiting system 200 that facilitates artificially intelligent compilation of quantum circuits for quantum computing in accordance with one or more embodiments described herein.

In various instances, the access component 202 can electronically receive, retrieve, obtain, import, or otherwise access, from any suitable data structures or from any suitable computing devices, quantum circuit 120 or the target gate set 122. In any case, the access component 202 can electronically access (e.g., send or receive data or program instructions to or from) the quantum computer 112, the quantum circuit 120, or the target gate set 122, such that other components of the circuit compilation system 102 can electronically interact with the quantum computer 112, the quantum circuit 120, or the target gate set 122. That is, in various embodiments, the access component 202 can receive the quantum circuit 120 and the target gate set 122 as input.

In various cases, the target gate set 122 can be the native gate set of quantum computer 112. As a non-limiting example, if the native gate set of the quantum computer 112 includes Pauli rotations, the target gate set 122 can be such Pauli rotations. In other instances, the target gate set 122 can be a fault-tolerant gate set specifically designed for error-correction schemes on quantum computer 112. As a non-limiting example, if the quantum computer 112 employs the gross code for error correction, the target gate set 122 can be a set of gates such as Pauli rotations that are compatible with the gross code architecture. In other cases, the target gate set 122 can be a set of gates that are optimized for particular quantum algorithms on quantum computer 112. As a non-limiting example, if quantum circuit 120 is a Clifford circuit, the target gate set 122 can include Pauli rotation gates $$\left(\text{e.g., of form } \exp\left(i\frac{\pi}{4}P\right)\right)$$

since these gates are well-suited for synthesizing Clifford circuits on fault-tolerant architectures.

In various embodiments, the access component 202 can electronically access, in any suitable fashion, the quantum computer 112, such that the circuit compilation system 102 can electronically activate (e.g., power-up), electronically deactivate (e.g., power-down), or otherwise electronically control the quantum computer 112.

In various aspects, synthesis component 204 can synthesize quantum circuit 120 to be implementable on target gate set 122 via reinforcement learning model 210. More specifically, synthesis component 204 can synthesize quantum circuit 120 into a sequence of Pauli rotations that are implementable on (e.g., falls within design constraints of) the architecture of quantum computer 112. In various aspects, the sequence of Pauli rotations can be considered the transpiled quantum circuit 124.

That is, the transpiled quantum circuit 124 can be considered as a functionally equivalent (to within any suitable threshold fidelity) version of the quantum circuit 120 that is executable, implementable, or performable on the quantum computer 112. In other words, the transpiled quantum circuit 124 can be considered as a reformatted or rewritten version of the quantum circuit 120, which reformatted or rewritten version is supported by the topology or hardware of the quantum computer 112 (or target gate set 122). In various instances, as described herein, the synthesis component 204 can generate the transpiled quantum circuit 124, by leveraging the reinforcement learning model 210. Non-limiting aspects are described with respect to FIGS. 3-8.

In various embodiments, the synthesis component 204 can electronically store, maintain, control, or otherwise access the reinforcement learning model 210. In various aspects, the reinforcement learning model 210 can exhibit any suitable internal architecture. In various instances, the reinforcement learning model 210 can be a deep learning neural network. For example, can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its specific internal architecture (e.g., of its specific numbers, types, or organizations of layers), the reinforcement learning model 210 can be configured to synthesize or transpile quantum circuit 120 to a sequence of Pauli rotations with respect to target gate set 122. Accordingly, the synthesis component 204 can execute the reinforcement learning model 210 on the quantum circuit 120, and such execution can cause the reinforcement learning model 210 to produce transpiled quantum circuit 124. More specifically, the synthesis component 204 can feed the quantum circuit 120 to the input layer of the reinforcement learning model 210. In various cases, the quantum circuit 120 can complete a forward pass through the one or more hidden layers of the reinforcement learning model 210. In various aspects, the output layer of the reinforcement learning model 210 can compute or calculate the determine the sequence of Pauli rotations based on activations provided by the one or more hidden layers of the reinforcement learning model 210.

In order for the herein-described functionalities to be accurate, correct, or reliable, the reinforcement learning model 210 described herein can first undergo training. In various embodiments, training component 206 can facilitate such training of the reinforcement learning model. Non-limiting aspects of such training are described with respect to FIGS. 3-6.

In various instances, the execution component 208 can instruct, command, or otherwise cause the transpiled quantum circuit 124 to be executed on, implemented on, or otherwise performed on the quantum computer 112. That is, the execution component 208 can initialize the states of the set of qubits 116 in any suitable fashion and can manipulate those initialized states according to whatever quantum operations are specified or otherwise called for by the quantum circuit 120. After such execution, the execution component 208 can instruct, command, or otherwise cause the quantum computer 112 to perform a respective quantum read or measurement operation on each of the set of qubits 116.

Note that, in various instances, the access component 202, the synthesis component 204, the training component 206, and the execution component 208 can collectively be considered as being one or more software components of the circuit compilation system 102. In various aspects, it should be appreciated that the one or more software components are described primarily herein as comprising four components (e.g., the access component 202, the synthesis component 204, the training component 206, and the execution component 208) for ease of explanation and illustration. However, the one or more software components are not limited to being implemented as exactly such three components in every embodiment. Indeed, in some embodiments, the functionalities described herein of such four components can be combined in any suitable fashions, so as to be implemented in or by fewer than three components (e.g., in some cases, a single component can perform all of the functionalities that are described herein with respect to the access component 202, the synthesis component 204, the training component 206, and the execution component 208). In other embodiments, the functionalities described herein of such three components can instead be distributed, separated, split, or fragmented in any suitable fashions, so as to be implemented in or by more than three components (e.g., two or more components can facilitate the functionalities that are performable by the access component 202; two or more components can facilitate the functionalities that are performable by the synthesis component 204; two or more components can facilitate the functionalities that are performable by the training component 206; two or more components can facilitate the functionalities that are performable by the execution component 208).

Figure 3:
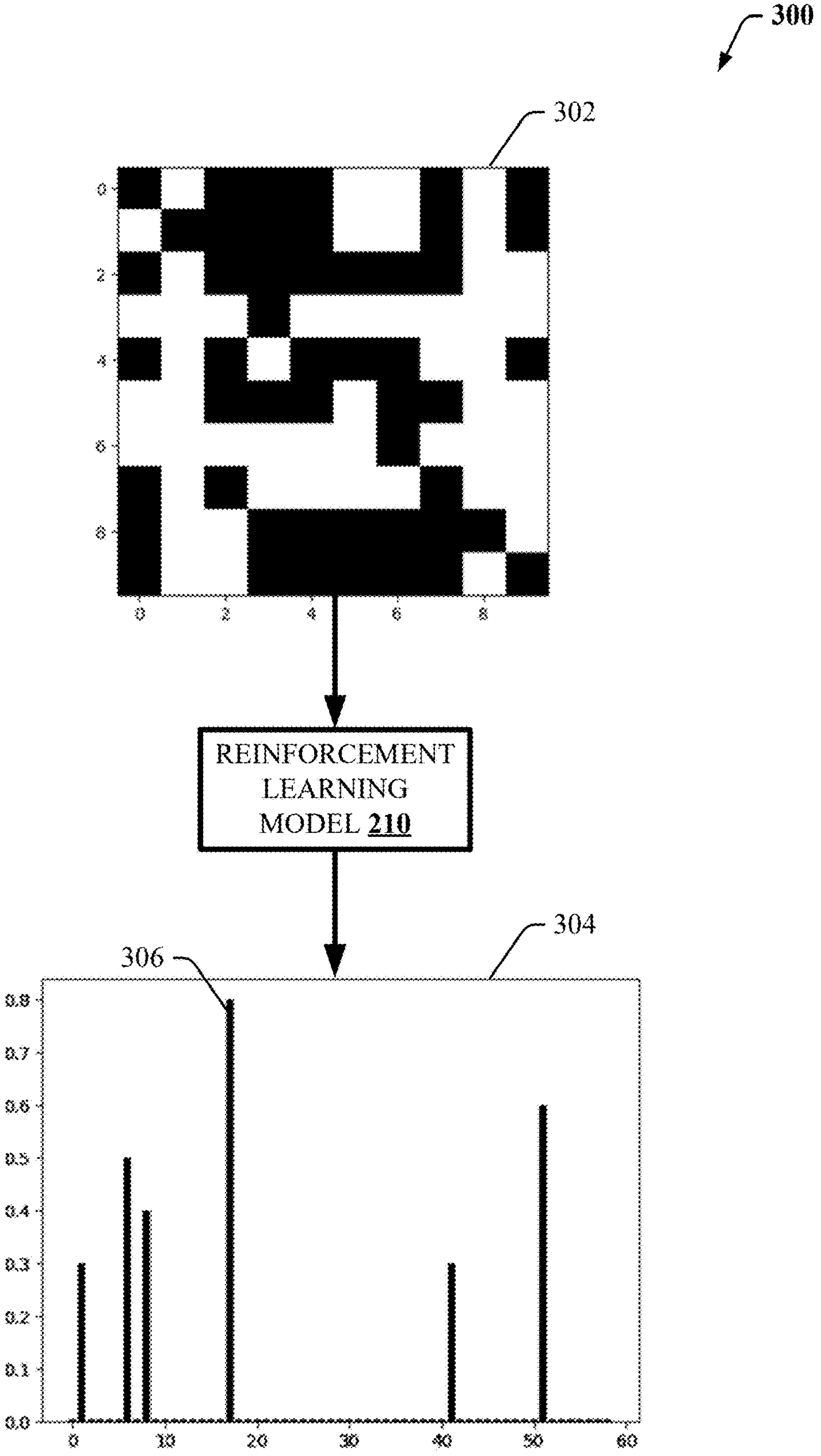
FIG. 3 illustrates an example, non-limiting diagram showing how a reinforcement learning model determines a next Pauli rotation in accordance with one or more embodiments described herein.

FIG. 3 illustrates an example, non-limiting diagram 300 showing how a reinforcement learning model determines a next Pauli rotation in accordance with one or more embodiments described herein.

In various aspects, the synthesis component 204 can determine the sequence of Pauli rotations in an iterative synthesis process. That is, the synthesis component 204 can iteratively execute the reinforcement learning model 210 on the quantum circuit 120 to iteratively determine a next Pauli rotation in the sequence of Pauli rotations. In various embodiments, the reinforcement learning model 210 can select the next Paili rotation based on a probability distribution.

For example, the reinforcement learning model 210 can receive a Clifford gate of the quantum circuit 120 as input. Accordingly, the synthesis component 204 can execute the reinforcement learning model 210 on the Clifford gate, and such execution can cause the reinforcement learning model 210 to produce a probability distribution 304.

In various aspects, the probability distribution 304 can refer to the discrete probabilistic distribution over possible Pauli rotations that can be applied at a particular iteration in the synthesis process of reinforcement learning model 210. That is, the probability distribution 304 can comprise the possible Pauli rotations that can be applied and their associated probabilities. The associated probabilities can indicate how likely applying the Pauli rotation is to produce a desired outcome or state in quantum circuit 120.

In various embodiments, synthesis component 204 can determine the next Pauli rotation from the probability distribution 304 using various methods. In some cases, the synthesis component 204 can determine which method to use based on user input. For example, a user can select (e.g., from a list of provided methods) which method to use (e.g., via any suitable user interface or display).

In various aspects, one method to determine the next Pauli rotation from the probability distribution 304 is to select a Pauli rotation with the highest probability. As shown in FIG. 3, for example, there can be 60 possible Pauli rotations that can be applied, each having an associated probability in probability distribution 304. In such case, synthesis component 204 can select Pauli rotation 306 since Pauli rotation 306 exhibits the highest probability (approximately 0.8) in probability distribution 304.

In various instances, another method to determine the next Pauli rotation from the probability distribution 304 is to sample the probability distribution 304. In various cases, synthesis component 204 can use any suitable method to sample the probability distribution 304, such as inverse transform sampling, rejection sampling, stratified sampling, or Monte Carlo methods. For example, inverse transform sampling can involve computing a cumulative probability distribution (CDF) from the probability distribution 304, generating a random number (probability) between 0 and 1, and then using the inverse CDF to select the corresponding Pauli rotation that corresponds to that probability. As another example, Monte Carlo methods can involve applying Monte Carlo simulations to generate samples by randomly selecting possible Pauli rotations according to the associated probabilities in probability distribution 304.

In various embodiments, the synthesis component 204 can represent the logical operations in the quantum circuit 120 as a binary matrix. For example, the synthesis component 204 can represent the Clifford operation as binary matrix 302. Specifically, in various cases, binary matrix 302 can be a 2n×2n binary matrix or tableau that includes both the X- and Z-components of Pauli operators. In this case, the binary matrix is a 9×9 matrix. In various aspects, each cell in the binary matrix 203 can represent binary values 0 or 1. As shown in FIG. 3, the cells representing binary value 0 are depicted by a white cell, and the cells representing binary value 1 are depicted by a black cell. The rows and columns of the binary matrix 302 encode transformation rules of the Clifford operation (e.g., stabilizer generators and Pauli operators, respectively).

Inputting the binary matrix 302 of the Clifford operation into reinforcement learning model 210 can enable more efficient circuit synthesis because it provides a structured, numerical format that is directly interpretable by the reinforcement learning model 210. That is, by encoding the Clifford operation into binary matrix 302, preprocessing complexity can be reduced. Further, using binary matrix representations can be more compatible with optimization, enabling reinforcement learning model 210 to analyze or synthesize quantum circuit 120 systematically. Note that, although binary matrices are used to represent the quantum circuit 120, any suitable representation of the quantum circuit 120 can be utilized as input to reinforcement learning model.

Figure 4:
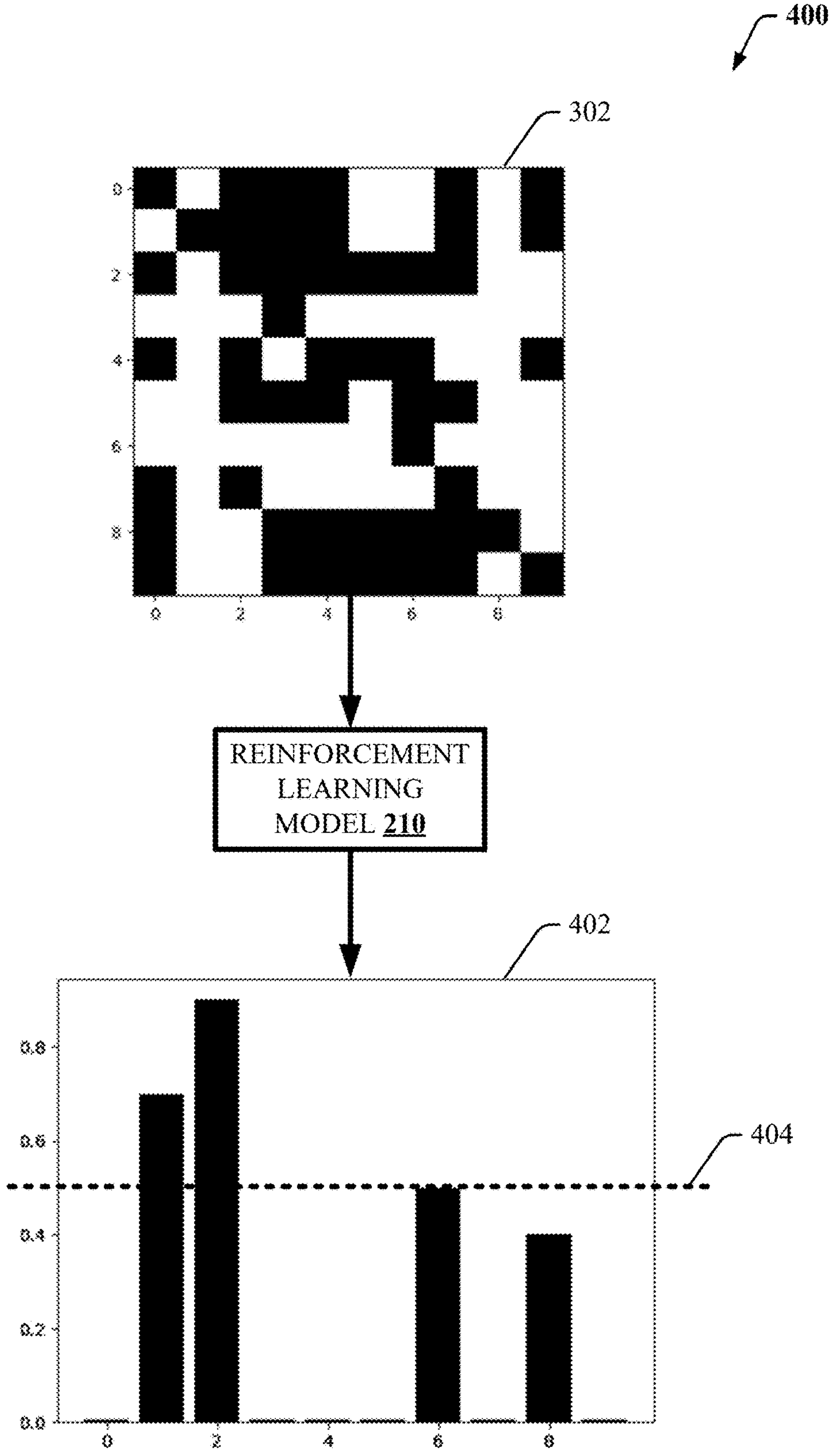
FIG. 4 illustrates an example, non-limiting diagram showing how a reinforcement learning model determines bits to encode a next Pauli rotation in accordance with one or more embodiments described herein.

FIG. 4 illustrates an example, non-limiting diagram 400 showing how a reinforcement learning model determines bits to encode a next Pauli rotation in accordance with one or more embodiments described herein.

In various embodiments, the synthesis component 204 can encode the next Pauli rotation as bitstrings. To encode the next Pauli rotation, synthesis component 204 can select the bits to encode the Pauli rotation based on a probability distribution. For example, reinforcement learning model can receive a Clifford gate of the quantum circuit 120 as input. Accordingly, the synthesis component 204 can execute the reinforcement learning model 210 on the Clifford gate, and such execution can cause the reinforcement learning model 210 to produce a probability distribution 402.

In various aspects, the probability distribution 402 can refer to the discrete probabilistic distribution over possible bits that can be used to encode the next Pauli rotation (e.g., the next Pauli rotation as selected based on probability distribution 304. That is, the probability distribution 304 can comprise the possible bits that can encode the next Pauli rotation and their associated probabilities. For example, as shown in FIG. 4, bits corresponding to values 0, 2, and 4 have higher probabilities, while the other bits have lower probabilities.

In various embodiments, the synthesis component 204 can select the bits to encode the Pauli rotation based on a defined threshold 404. For example, as depicted in FIG. 4, the defined threshold 404 can be 50%. Accordingly, synthesis component 204 can select bits with a probability above 50%. However, any suitable defined threshold can be used to select the bits to encode the next Pauli rotation. In various cases, the defined threshold can be user-defined. That is, a user can input a desired threshold (e.g., via any suitable user interface or display), and synthesis component 204 can select the bits based on the inputted threshold.

Figure 5:
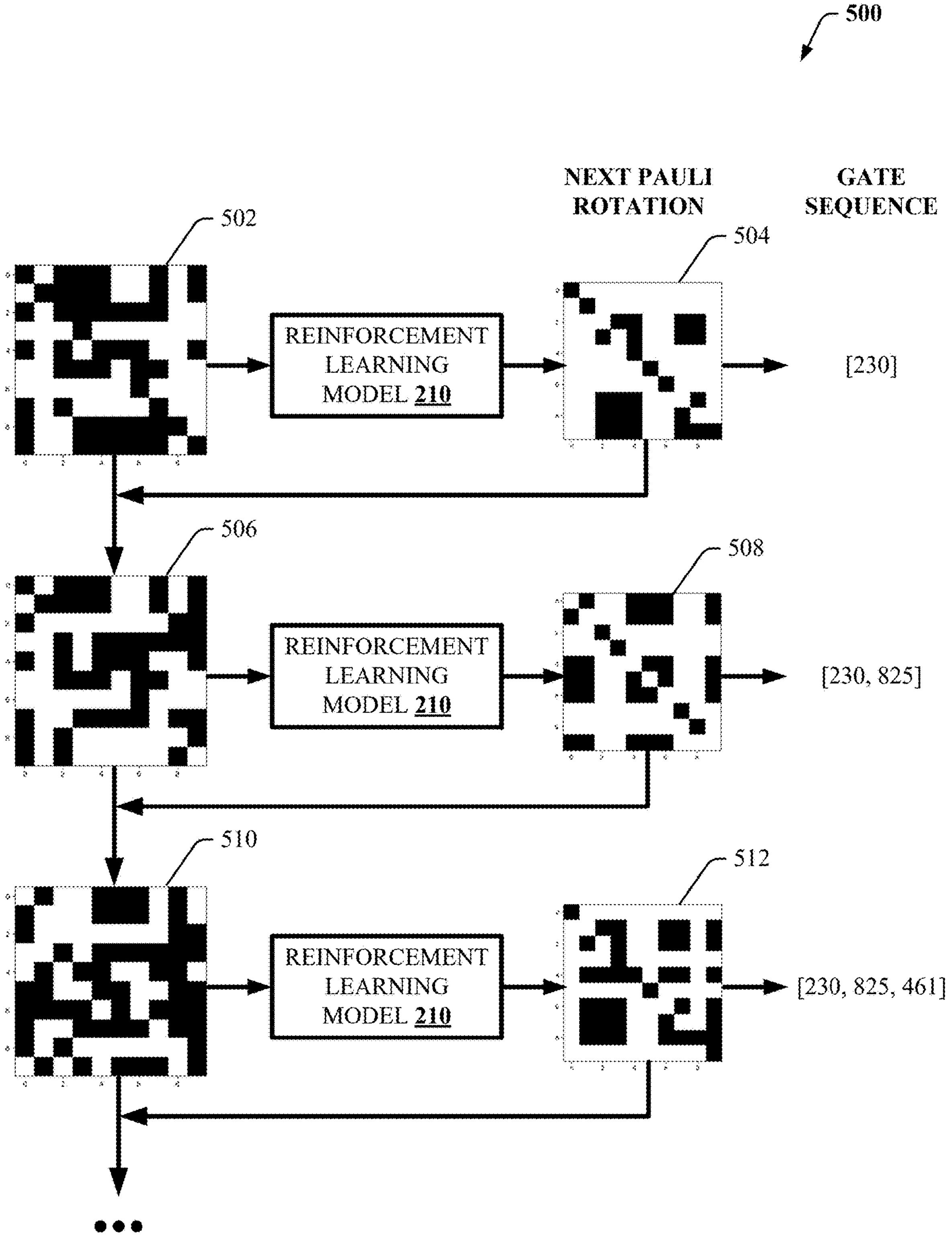
FIG. 5 illustrates an example, non-limiting diagram showing how a reinforcement learning model facilitates circuit synthesis in accordance with one or more embodiments described herein.

FIG. 5 illustrates an example, non-limiting diagram 500 showing how a reinforcement learning model facilitates circuit synthesis in accordance with one or more embodiments described herein.

As stated elsewhere in the present disclosure, the synthesis component 204 can determine the sequence of Pauli rotations in an iterative synthesis process. That is, the reinforcement learning model 210 can iteratively determine a next Pauli rotation in the sequence of Pauli rotations. Furthermore, iterative execution of the quantum circuit 120 can cause the reinforcement learning model 210 to iteratively produce gate sequence numbers for each next Pauli rotation determined. For example, as shown in FIG. 5, given binary matrix 502 of a Clifford gate, the reinforcement learning model 210 can determine a next Pauli rotation 504 (e.g., based on a probability distribution over possible Pauli rotations to apply) and a gate sequence of [230]. Accordingly, the synthesis component 204 can apply the next Pauli 504 rotation with the corresponding gate sequence, resulting in binary matrix 506. Similarly, given binary matrix 506 as input, reinforcement learning model 210 can determine a next Pauli rotation 508 in the sequence of Pauli rotations and a corresponding gate sequence of [230, 825]. Thereafter, the synthesis component 204 can apply the next Pauli rotation 508 with the corresponding gate sequence, resulting in binary matrix 510. Then, given binary matrix 510 as input, reinforcement learning model 210 can determine a next Pauli rotation 512 in the sequence of Pauli rotations and a corresponding gate sequence of [230, 825, 461]. Thus, the synthesis component 204 can apply the next Pauli rotation 512 with the corresponding gate sequence. This process can be iterated any number of times to produce a functionally equivalent sequence of Pauli rotations to the quantum circuit 120 (or until a maximum number of iterations has been reached). Such iterative process can yield the sequence of Pauli rotations that can be considered as the transpiled quantum circuit 124 of the quantum circuit 120.

Figure 6:
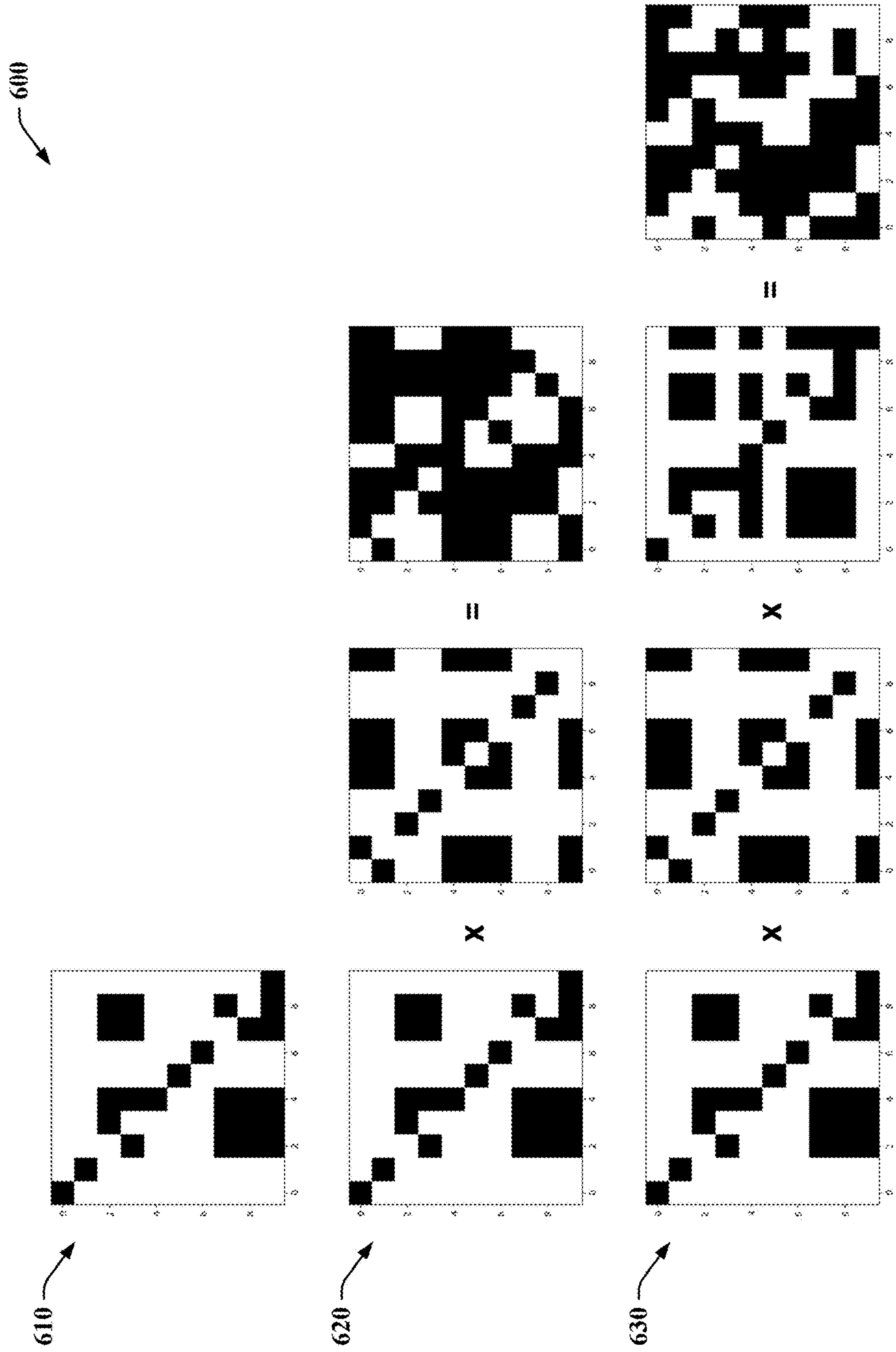
FIG. 6 illustrates an example, non-limiting diagram showing difficulty stages for training a reinforcement learning model in accordance with one or more embodiments described herein.

FIG. 6 illustrates an example, non-limiting diagram 600 of difficulty stages for training a reinforcement learning model in accordance with one or more embodiments described herein.

In various aspects, training component 206 can train the reinforcement learning model using a set of training circuits. In various instances, the set of training circuits can comprise training circuits of different difficulties. In other words, the set of training circuits can be categorized into two or more difficulty stages. For example, the two or more difficulty stages can comprise a "Difficulty 1" stage, a "Difficulty 2" stage, and a "Difficulty 3" stage, where the "Difficulty 1" stage indicates an easier difficulty of training circuits and the "Difficulty 3" stage indicates a harder difficulty of training circuits. In various aspects, the difficulty of the training circuits can be determined based on the known number of Pauli rotations required to synthesize the training circuit. For example, training circuits that require lower numbers of Pauli rotations can be assigned to lower difficulty stages. Conversely, training circuits that require higher numbers of Pauli rotations can be assigned to higher difficulty stages. In this way, training circuits belonging to lower difficulty stages can be considered as "easier" training circuits, whereas training circuits belonging to higher difficulty stages can be considered as "harder" training circuits.

Depicted in FIG. 6 are three non-limiting examples of training circuits that correspond to different difficulty stages. For instance, the "Difficulty 1" stage can include training circuit 610. Training circuit 610 can belong to the "Difficulty 1" stage because it requires only one Pauli rotation to synthesize. As another example, the "Difficulty 2" stage can include training circuit 620. Training circuit 620 can belong to the "Difficulty 2" stage because it requires two Pauli rotations to synthesize. As yet another example, the "Difficulty 3" stage can include training circuit 630. Training circuit 630 can belong to the "Difficulty 3" stage because it requires three Pauli rotations to synthesize. Note that these are mere non-limiting examples of training circuits and their assigned difficulty stages. That is, any suitable assignment of training circuits to difficulty stages can be used to train the reinforcement learning model 210. For example, there can be any suitable number of difficulty stages used (e.g., 5 difficulty stages, 7 difficulty stages, 10 difficulty stages, etc.). Further, training component 206 can assign the training circuits to the two or more difficulty stages based on any measure of difficulty. For example, as used herein, the difficulty of the training circuits is determined based on the known number of Pauli rotations required to synthesize the training circuit, however other metrics can be used as well.

In various aspects, the training component 206 can train the reinforcement learning model 210 using progressively more difficult difficulty stages. In other words, training component 206 can first train the reinforcement learning model 210 on an easiest (lowest) difficulty stage (e.g., on the training circuits in the easiest difficulty stage), and once finished training on the easiest difficulty stage, can proceed to a harder (higher) difficulty stage. For example, training component 206 can first train the reinforcement learning model 210 on training circuits belonging to the "Difficulty 1" stage. Once training in the "Difficulty 1" stage has finished, training component 206 can proceed to train the reinforcement learning model 210 on training circuits belonging to the "Difficulty 2" stage. Accordingly, once training in the "Difficulty 2" stage has finished, training component 206 can proceed to train the reinforcement learning model 210 on training circuits belonging to the "Difficulty 3" stage.

Figure 7:
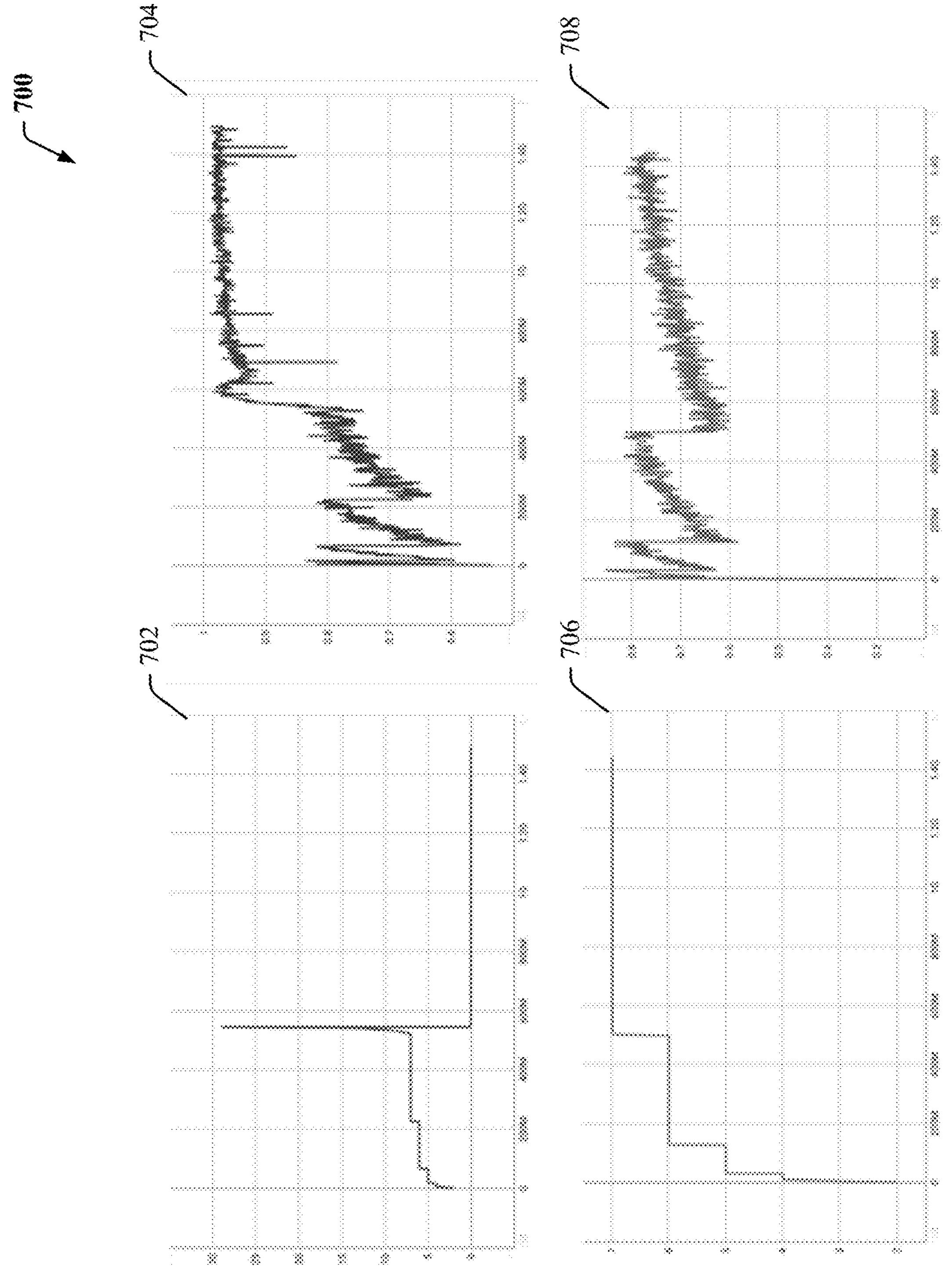
FIG. 7 illustrates example, non-limiting performance metrics of a reinforcement model for different difficulty stages in accordance with one or more embodiments described herein.

FIG. 7 illustrates example, non-limiting performance metrics 700 of a reinforcement model for different difficulty stages in accordance with one or more embodiments described herein.

In various embodiments, training component 206 can proceed to different difficulty stages based on a defined threshold of performance. In other words, once the reinforcement learning model 210 has reached a defined threshold of performance, such as a success rate, the training component 206 can proceed to a difficulty stage of higher difficulty.

For example, graphs 702, 704, 706, and 708 depict the success rate of reinforcement learning model 210 at different difficulty stages. In particular, graph 702 depicts the difficulty stage and graph 704 depicts the corresponding success rates. As shown, once the reinforcement learning model 210 reaches a desired success rate, the training component 206 progresses to a more difficult training stage. This can be similarly shown in graph 706, which depicts the difficulty stage, and graph 708, which depicts the corresponding success rates. Further as shown in graphs 704 and 708, reinforcement learning model 210 progressively reaches higher, and more consistent, success rates as the training component 206 progresses to more difficult training stages.

Figure 8:
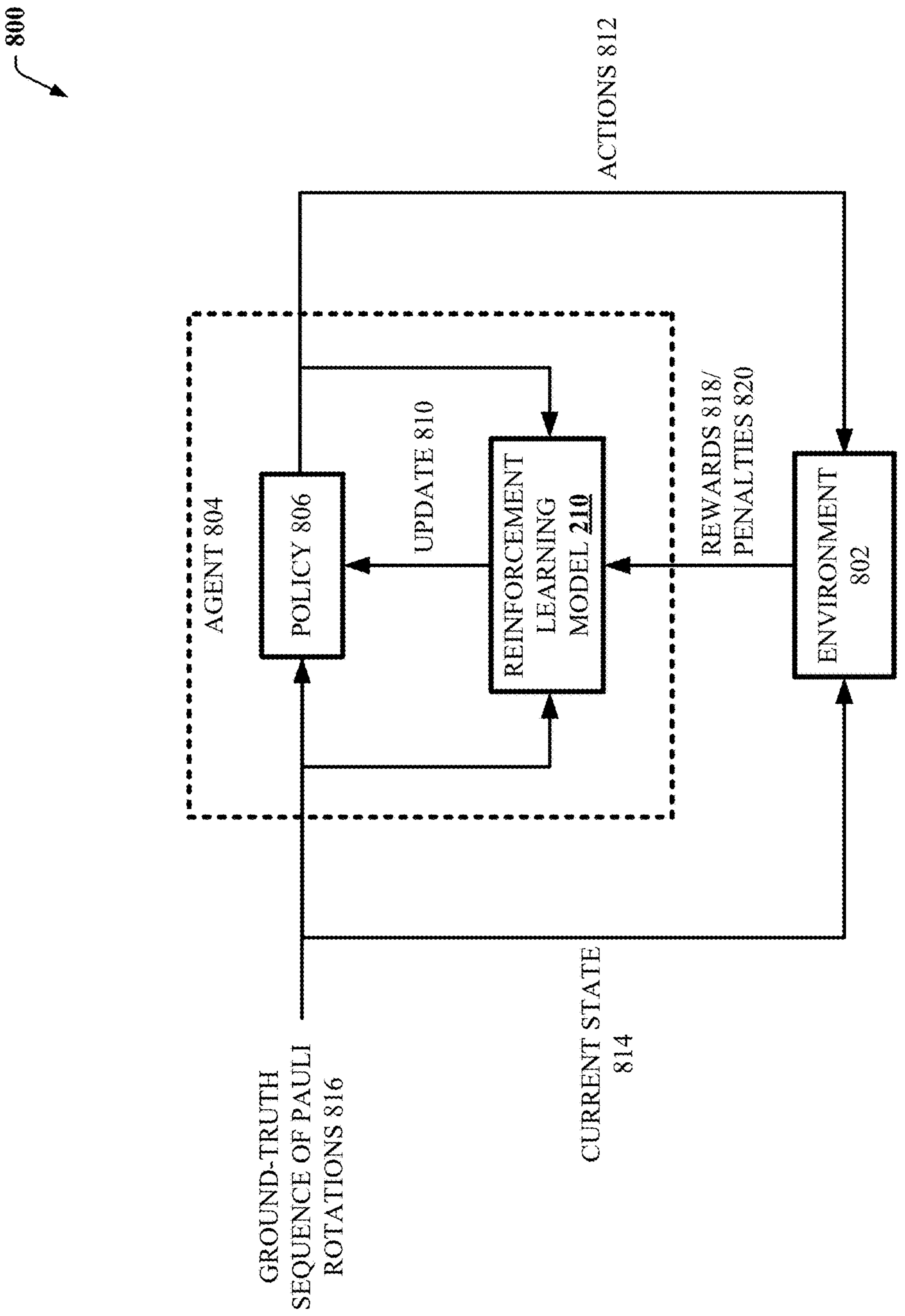
FIG. 8 illustrates an example, non-limiting block diagram showing how the reinforcement learning model can be trained in accordance with one or more embodiments described herein.

FIG. 8 illustrates an example, non-limiting block diagram 800 showing how the reinforcement learning model can be trained in accordance with one or more embodiments described herein.

In various aspects, prior to beginning training, the trainable internal parameters (e.g., convolutional kernels, weight matrices, bias values) of the reinforcement learning model 210 can be initialized in any suitable fashion (e.g., via random initialization).

In various embodiments, there can be a set of training circuits, as described with respect to FIGS. 7 and 8. For each training circuit, the following method can be applied to train the reinforcement learning model 210.

In various aspects, there can be a current state 814 and a ground-truth sequence of Pauli rotations 816. The current state 814 can be any suitable state that describes the quantum computer 112 at a given time (e.g., the current configuration of qubits, the target output of the quantum circuit, the intermediate output of a gate in the quantum circuit). The ground-truth sequence of Pauli rotations 816 can be a known sequence of Pauli rotations that correctly implements the desired transformation or operation on the quantum system (e.g., that is functionally equivalent to a given quantum circuit). In this setup, environment 802 can be the quantum system or quantum circuit that the agent 804 interacts with, including the state of the quantum system and the rules that govern how the quantum circuit evolves when actions 812 (e.g., Pauli rotations) are applied. Agent 804 can take actions 812 to manipulate the quantum circuit towards the desired transformation. Policy 806 is the decision-making strategy used by the agent 804 to determine which Pauli rotations to apply based on the current state 814, guiding the agent 804 to optimize the circuit synthesis process. In various aspects, the actions 812 that agent 804 can take can include applying a Pauli rotation that results in an updated current state 814.

The format, size, or dimensionality of the predicted sequence of Pauli rotations can be dictated by the structure of the reinforcement learning model 210, including the number of neurons, layers, or other internal parameters. The reinforcement learning model 210 can ensure that the output corresponds to a sequence of Pauli rotations that the agent 804 believes will most efficiently implement the desired quantum operation, allowing the quantum computer 112 to evolve towards the correct state. Policy 806 can improve over time as the agent 804 interacts with environment 802, learning to apply the most effective next Pauli rotation based on feedback in the form of rewards 818 or penalties 820.

In various aspects, any suitable rewards 818 or penalties 820 can be applied. In various embodiments, rewards 818 can be applied when the predicted sequence of Pauli rotations is correct (e.g., matches the ground-truth sequence of Pauli rotations 816). In such cases, the rewards 818 can have a larger magnitude than other rewards applied to provide a stronger signal for agent 804 to prioritize certain actions. In various cases, penalties 820 can be applied for each iteration the reinforcement learning model 210 takes to generate the full sequence of Pauli rotations. Thus, shorter sequences of Pauli rotations can be encouraged for transpiling a given quantum circuit.

In various aspects, the predicted sequence of Pauli rotations can be considered the sequence of Pauli rotations that the reinforcement learning model 210 believes should be applied to the quantum circuit to achieve the desired transformation. This sequence might correspond to a set of Pauli rotations with specific parameters, such as rotation angles, and can be structured to optimize performance with respect to the quantum system's dynamics. If the network has undergone little or no training, the predicted sequence of Pauli rotations may not be optimal, and the synthesized quantum circuit might require further refinement or gate optimization to achieve the target operation.

In various instances, an error signal (such as the difference between the predicted sequence of Pauli rotations and the ground-truth sequence of Pauli rotations 816) can be computed. The error signal can be used to make an update 810 to the policy 806 of agent 804. In various aspects, policy 806 can be incrementally updated (by update 810) using the computed error signal, refining the neural synthesis capabilities of reinforcement learning model 210 to generate optimized transpiled quantum circuits.

In various cases, such execution-and-update procedure can be repeated for any suitable number of training quantum circuits. This can ultimately cause the trainable internal parameters of the reinforcement learning model 210 to become iteratively optimized for accurately producing transpiled quantum circuit 124 based on the target gate set 122. In various aspects, any suitable training batch sizes, any suitable error/loss functions, or any suitable training termination criteria can be utilized during such training.

Although FIG. 8 shows the reinforcement learning model 210 as being trained in supervised fashion, this is a mere non-limiting example for ease of explanation and illustration. In various embodiments, any other suitable training paradigms can be used to train the reinforcement learning model 210, such as unsupervised training, any of which may be federated or non-federated.

Figure 9:
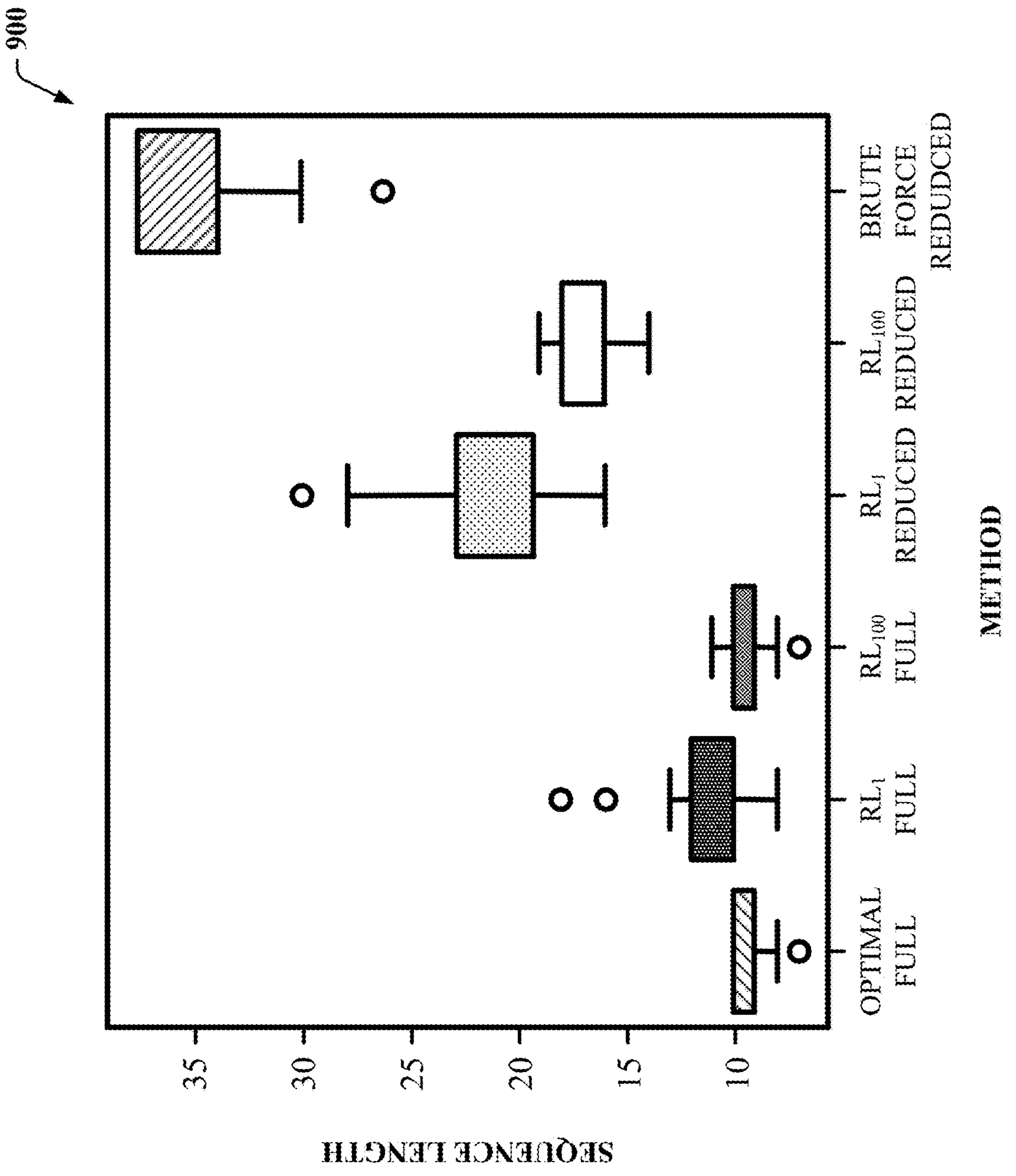
FIG. 9 illustrates example, non-limiting experimental results in accordance with one or more embodiments described herein.

FIG. 9 illustrates example, non-limiting experimental results in accordance with one or more embodiments described herein. Specifically, FIG. 9 shows a box plot 900 whose horizontal axis represents the method used for circuit synthesis and whose vertical axis represents sequence length (e.g., how many gates are in the synthesized or transpiled circuit). In particular, these methods are applied to a Clifford circuit for circuit synthesis over the gross code.

The optimal full method shows results of sequence length for a known circuit synthesis over the full gate set (e.g., full Pauli set). The method $RL_1$ Full uses the reinforcement learning model 210 over the full gate set with one attempt. The method $RL_{100}$ Full uses the reinforcement learning model 210 over the full gate set with 100 attempts. The method $RL_1$ Reduced uses the reinforcement learning model 210 over the reduced gate set with one attempt. The method $RL_{100}$ Reduced uses the reinforcement learning model 210 over the reduced gate set with 100 attempts. As shown, over the full gate set, the various embodiments described herein are able to achieve near optimal sequence lengths (e.g., near optimal full).

Contrast this with the brute-force decomposition to the reduced set of Paulis, which instead produces significantly longer sequence lengths. In particular, the various embodiments described herein achieve on average sequences of length 17, which is approximately half than that which the brute-force method produces, which is on average sequences of length 35.

Further as shown by these experimental results, various embodiments described herein can improve circuit synthesis, and particularly for Clifford circuits on the gross code, thus reducing noise for general applications. In particular, the various embodiments described herein achieve the theoretical optimum value in sequence length when transpiling to the set of all Paulis (e.g., full Pauli set), even for quantum circuits that do not have an optimal algorithm for decomposition. Specifically, the various embodiments described herein achieve a sequence length of 1.7 times the optimum value using all Paulis, even when synthesizing with just the automorphisms (e.g., transformations that map Pauli operators to other Pauli operators while preserving their commutation and anticommutation relationships), though the set of automorphisms is ~30 times smaller than the full Pauli set.

These experimental results help to demonstrate that various embodiments described herein constitute concrete and tangible technical improvements in the field of quantum circuit transpilation.

Additionally, the various embodiments described herein can be integrated into quantum software frameworks (e.g., Qiskit) as they advance toward higher levels of abstraction, such as error-corrected quantum computing.

Figure 10:
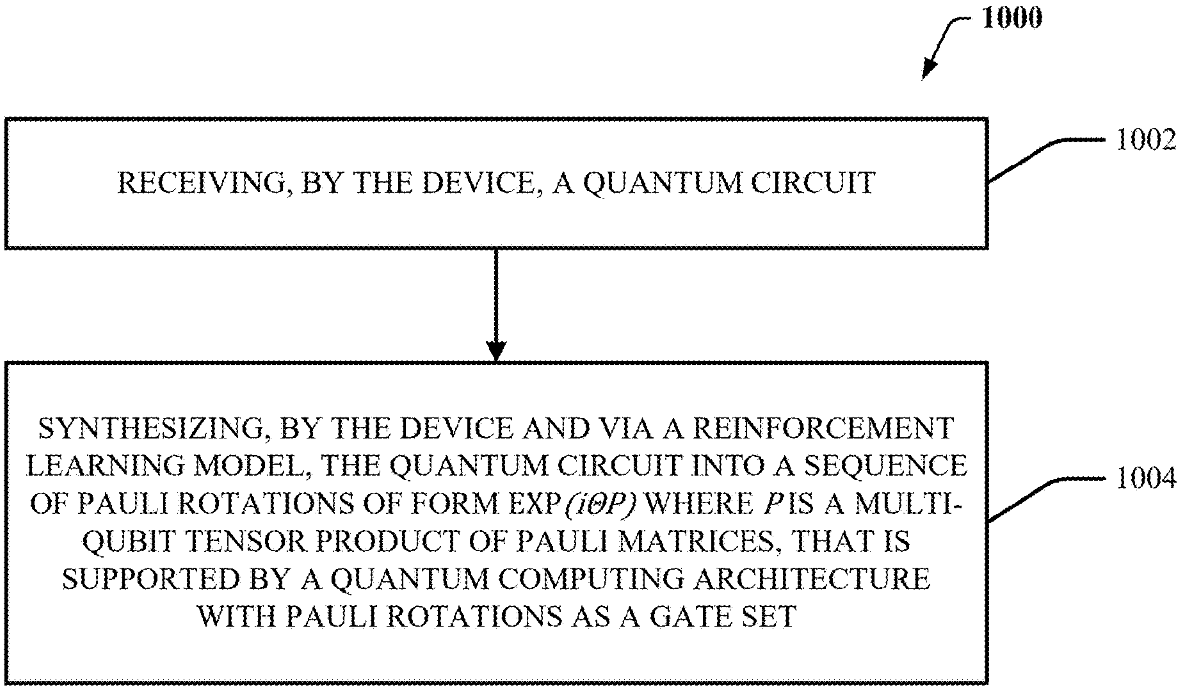
FIG. 10 illustrates a flow diagram of an example, non-limiting computer-implemented method that facilitates artificially intelligent compilation of quantum circuits for quantum computing in accordance with one or more embodiments described herein.

FIG. 10 illustrates a flow diagram of an example, non-limiting computer-implemented method 1000 that can facilitate artificially intelligent compilation of quantum circuits for quantum computing in accordance with one or more embodiments described herein. In various cases, the circuit compilation system 102 can facilitate the computer-implemented method 1000.

In various embodiments, act 1002 can include receiving, by a device (e.g., via 202) operatively coupled to a processor (e.g., 104), a quantum circuit (e.g., 120). In various aspects, the quantum circuit can not yet be implementable on a quantum computer (e.g., 112).

In various aspects, act 1004 can include synthesizing, by the device (e.g., via 204) and via a reinforcement learning model (e.g., 210), the quantum circuit into a sequence of Pauli rotations of form exp(iθP), where P is a multi-qubit tensor product of Pauli matrices, that is supported by a quantum computing architecture with Pauli rotations as a gate set.

Figure 11:
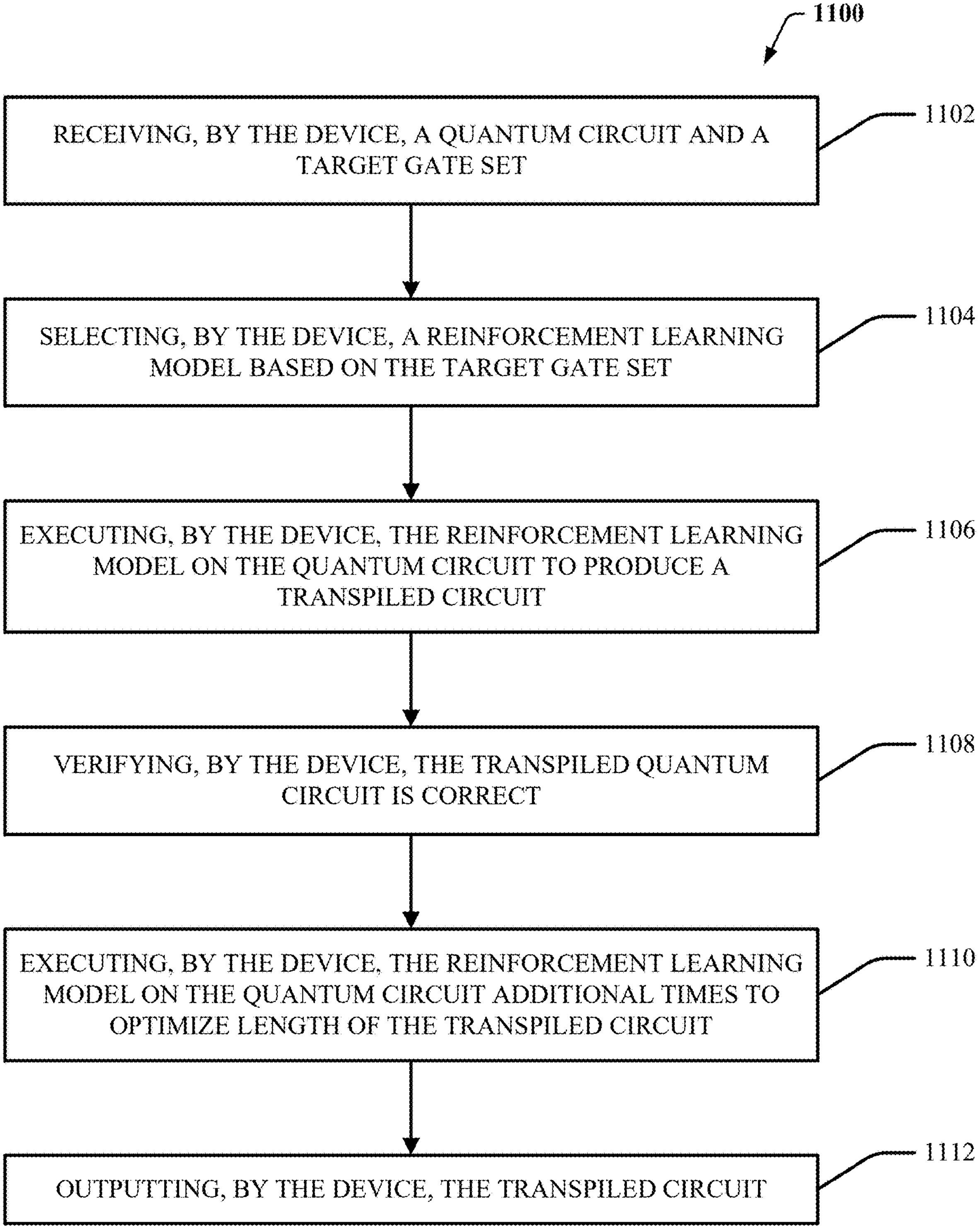
FIG. 11 illustrates a flow diagram of an example, non-limiting computer-implemented method that facilitates circuit synthesis via a reinforcement learning model in accordance with one or more embodiments described herein.

FIG. 11 illustrates a flow diagram of an example, non-limiting computer-implemented method 1100 that can facilitate circuit synthesis via a reinforcement learning model in accordance with one or more embodiments described herein. In various cases, the circuit compilation system 102 can facilitate the computer-implemented method 1100.

In various embodiments, act 1102 can include receiving, by a device (e.g., via 202) operatively coupled to a processor (e.g., 104), a quantum circuit (e.g., 120) and a target gate set (e.g., 122). In various cases, the target gate set can be associated with a quantum computer (e.g., 112). For example, the target gate set can be the native gate set of the quantum computer.

In various aspects, act 1104 can include selecting, by the device (e.g., via 204), a reinforcement learning model (e.g., 210), based on the target gate set.

In various aspects, act 1106 can include executing, by the device (e.g., via 204), the reinforcement learning model on the quantum circuit to produce a transpiled circuit (e.g., 124).

In various aspects, act 1108 can include verifying, by the device (e.g., via 204), the transpiled quantum circuit is correct.

In various aspects, act 1110 can include executing, by the device (e.g., via 204), the reinforcement learning model on the quantum circuit additional times to optimize length of the transpiled circuit.

In various aspects, act 1112 can include outputting, by the device (e.g., via 204), the transpiled circuit.

Although not explicitly shown in FIG. 11, the computer-implemented method 1100 can further include executing, by the device (e.g., via 208), the transpiled circuit on the quantum computer.

Figure 12:
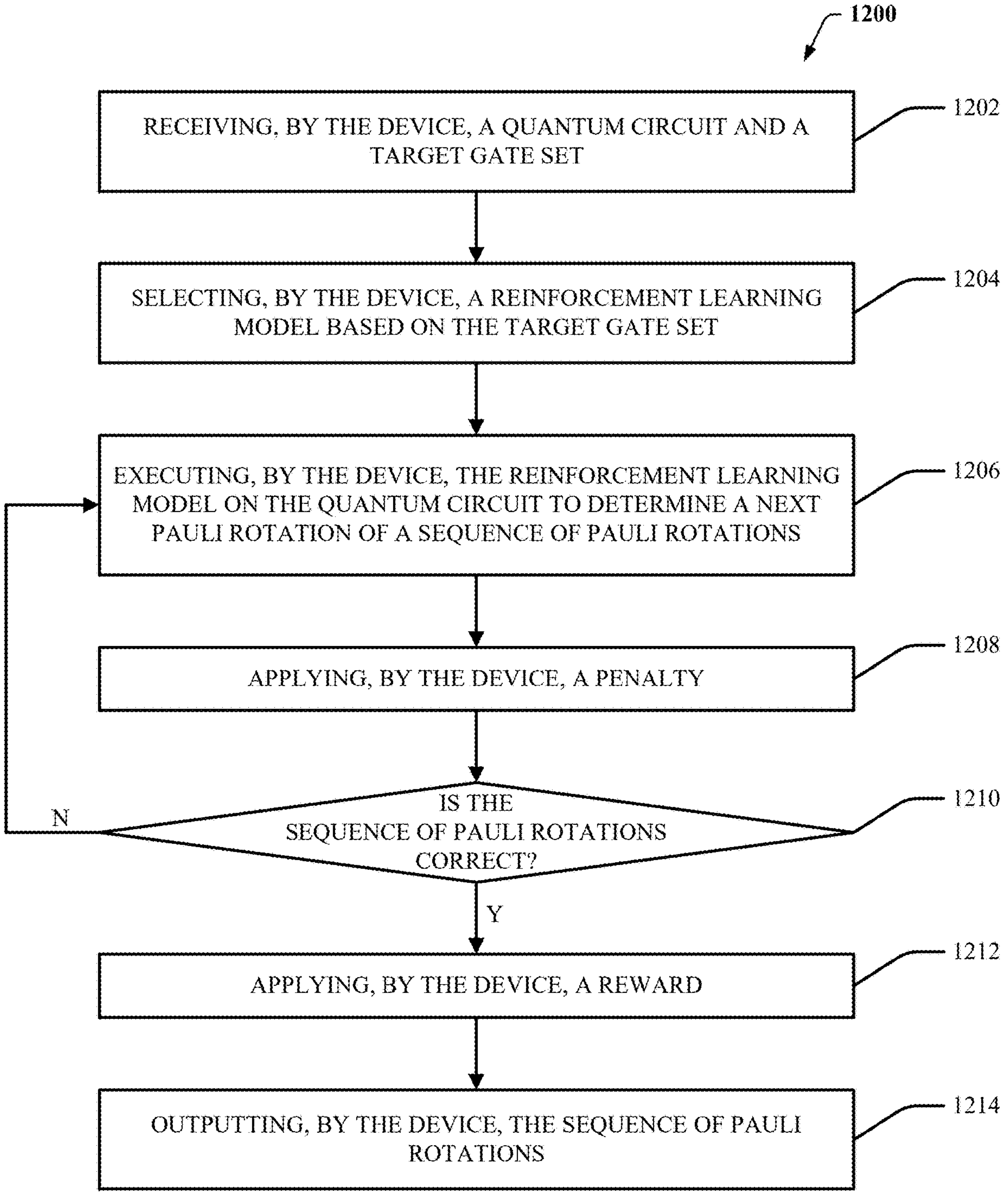
FIG. 12 illustrates a flow diagram of an example, non-limiting computer-implemented method that facilitates training of a reinforcement learning model for circuit synthesis in accordance with one or more embodiments described herein.

FIG. 12 illustrates a flow diagram of an example, non-limiting computer-implemented method 1200 that can facilitate training of a reinforcement learning model for circuit synthesis in accordance with one or more embodiments described herein. In various cases, the circuit compilation system 102 can facilitate the computer-implemented method 1200.

In various embodiments, act 1202 can include receiving, by a device (e.g., via 202) operatively coupled to a processor (e.g., 104), a quantum circuit (e.g., 120) and a target gate set (e.g., 122).

In various aspects, act 1204 can include selecting, by the device (e.g., via 204), a reinforcement learning model (e.g., 210), based on the target gate set.

In various aspects, act 1206 can include executing, by the device (e.g., via 204), the reinforcement learning model on the quantum circuit to determine a next Pauli rotation of a sequence of Pauli rotations.

In various aspects, act 1208 can include applying, by the device (e.g., via 206), a penalty.

In various aspects, act 1210 can include determining, by the device (e.g., via 206), whether the sequence of Pauli rotations is correct. If so, the computer-implemented method 1200 can proceed to act 1212. If not, the computer-implemented method 1200 can proceed back to act 1206.

In various aspects, act 1212 can include applying, by the device (e.g., via 206), a reward.

In various aspects, act 1214 can include outputting, by the device (e.g., via 204), the sequence of Pauli rotations.

Although the methods and various embodiments described herein mostly relate to transpilation or synthesis of Clifford circuits over the gross code, this can be applied to any quantum circuit to transpile or synthesize over any target gate set.

Figure 13:
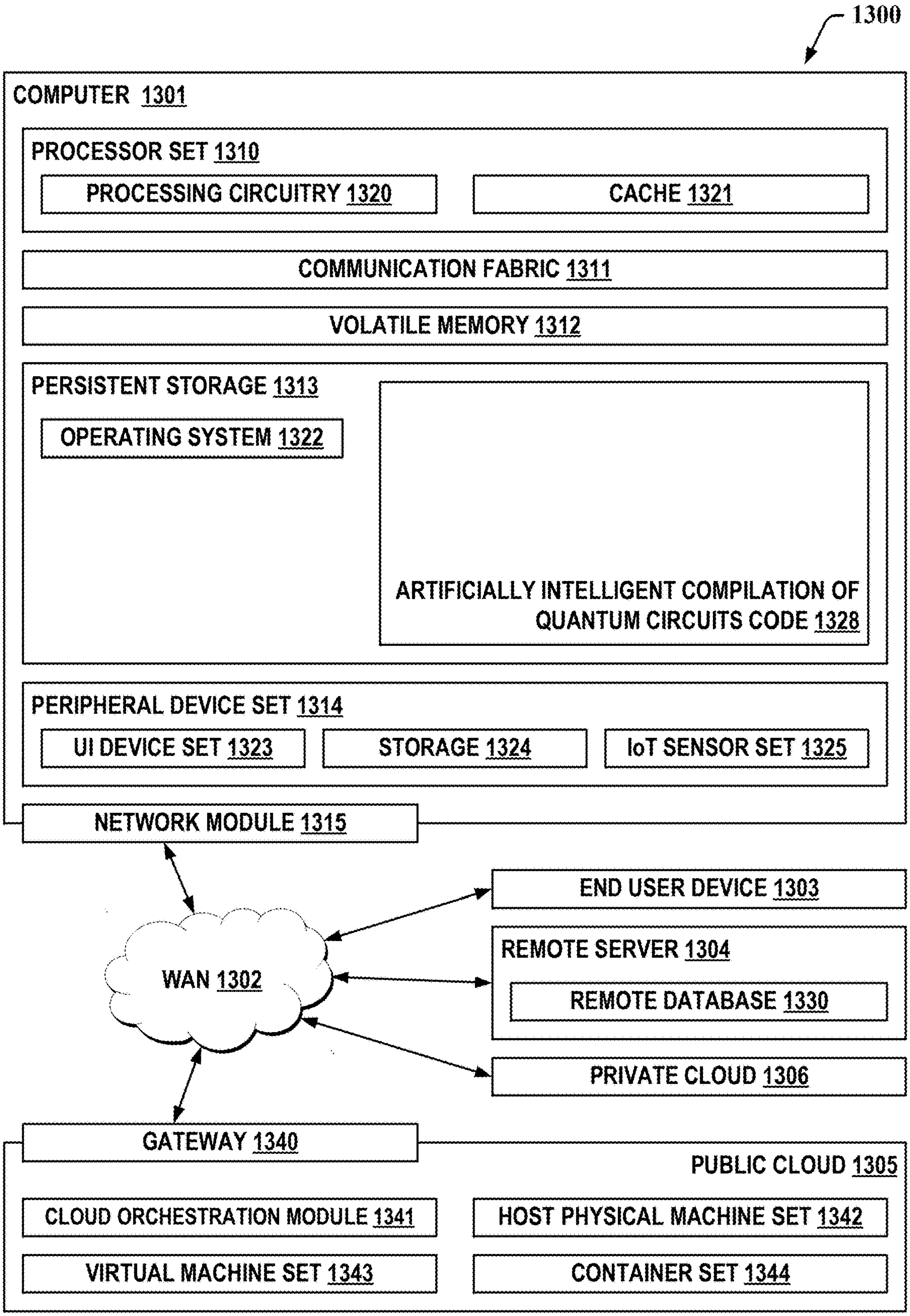
FIG. 13 illustrates a block diagram of an example, non-limiting operating environment in which one or more embodiments described herein can be facilitated.

FIG. 13 and the following discussion are intended to provide a general description of a suitable computing environment 1300 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code involved in performing the inventive methods, such as artificially intelligent compilation of quantum circuits code 1380. In addition to block 1380, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1380, as identified above), peripheral device set 1314 (including user interface (UI), device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method can be distributed among multiple computers or between multiple locations. On the other hand, in this presentation of computing environment 1300, detailed discussion is focused on a single computer, specifically computer 1301, to keep the presentation as simple as possible. Computer 1301 can be located in a cloud, even though it is not shown in a cloud in FIG. 13. On the other hand, computer 1301 is not required to be in a cloud except to any extent as can be affirmatively indicated.

PROCESSOR SET 1310 includes one, or more, computer processors of any type now known or to be developed in the future. Processing circuitry 1320 can be distributed over multiple packages, for example, multiple, coordinated integrated circuit chips. Processing circuitry 1320 can implement multiple processor threads or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set can be located "off chip." In some computing environments, processor set 1310 can be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods can be stored in block 1380 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths or wireless communication paths.

VOLATILE MEMORY 1312 is any type of volatile memory now known or to be developed in the future. Examples include dynamic type random access memory (RAM) or static type RAM. Typically, the volatile memory is characterized by random access, but this is not required unless affirmatively indicated. In computer 1301, the volatile memory 1312 is located in a single package and is internal to computer 1301, but, alternatively or additionally, the volatile memory can be distributed over multiple packages or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 or directly to persistent storage 1313. Persistent storage 1313 can be a read only memory (ROM), but typically at least a portion of the persistent storage allows writing of data, deletion of data and re-writing of data. Some familiar forms of persistent storage include magnetic disks and solid-state storage devices. Operating system 1322 can take several forms, such as various known proprietary operating systems or open-source Portable Operating System Interface type operating systems that employ a kernel. The code included in block 1380 typically includes at least some of the computer code involved in performing the inventive methods.

PERIPHERAL DEVICE SET 1314 includes the set of peripheral devices of computer 1301. Data communication connections between the peripheral devices and the other components of computer 1301 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1323 can include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 can be persistent or volatile. In some embodiments, storage 1324 can take the form of a quantum computing storage device for storing data in the form of qubits. In embodiments where computer 1301 is required to have a large amount of storage (for example, where computer 1301 locally stores and manages a large database) then this storage can be provided by peripheral storage devices designed for storing large amounts of data, such as a storage area network (SAN) that is shared by multiple, geographically distributed computers. IoT sensor set 1325 is made up of sensors that can be used in Internet of Things applications. For example, one sensor can be a thermometer and another sensor can be a motion detector.

NETWORK MODULE 1315 is the collection of computer software, hardware, and firmware that allows computer 1301 to communicate with other computers through WAN 1302. Network module 1315 can include hardware, such as modems or Wi-Fi signal transceivers, software for packetizing or de-packetizing data for communication network transmission, or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future.

In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301) and can take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 can be a client device, such as thin client, heavy client, mainframe computer or desktop computer.

REMOTE SERVER 1304 is any computer system that serves at least some data or functionality to computer 1301. Remote server 1304 can be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data can be provided to computer 1301 from remote database 1330 of remote server 1304.

PUBLIC CLOUD 1305 is any computer system available for use by multiple entities that provides on-demand availability of computer system resources or other computer capabilities, especially data storage (cloud storage) and computing power, without direct active management by the scale. The direct and active management of the computing resources of public cloud 1305 is performed by the computer hardware or software of cloud orchestration module 1341. The computing resources provided by public cloud 1305 are typically implemented by virtual computing environments that run on various computers making up the computers of host physical machine set 1342, which is the universe of physical computers in or available to public cloud 1305. The virtual computing environments (VCEs) typically take the form of virtual machines from virtual machine set 1343 or containers from container set 1344. It is understood that these VCEs can be stored as images and can be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware and firmware allowing public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 1305 and private cloud 1306 are both part of a larger hybrid cloud.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality or operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

As used in this application, the terms "component," "system," "platform" or "interface" can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter described herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples of various embodiments. For ease of description or explanation, various portions of the herein disclosure utilize the term "each", "every", or "all" when discussing various embodiments. Such usages of the term "each", "every", or "all" are non-limiting examples. In other words, when the herein disclosure provides a description that is applied to "each", "every", or "all" of some particular object or component, it should be understood that this is a non-limiting example of various embodiments, and it should be further understood that, in various other embodiments, it can be the case that such description applies to fewer than "each", "every", or "all" of that particular object or component.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising:

a memory that stores computer executable components; and a processor that executes the computer executable components stored in the memory, wherein the computer executable components comprise:

an access component that receives a quantum circuit;

a synthesis component that synthesizes, via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set; and a training component that trains the reinforcement learning model, wherein training the reinforcement learning model comprises:

applying a penalty for circuit depth; and applying a reward for a correct circuit.

2. The system of claim 1, wherein the quantum circuit is a Clifford circuit.

3. The system of claim 1, wherein the quantum circuit is a sequence of $$\exp\left(i\frac{\pi}{8}P\right)$$

gates.

4. The system of claim 1, wherein the synthesis component implements the sequence of Pauli rotations of form exp(iθP) through fault-tolerant logical Pauli measurements in an error correction code, wherein the error correction code is a bivariate bicycle code.

5. The system of claim 4, wherein the access component receives a target gate set that is supported by the quantum computing architecture and the error correction code, and wherein the synthesis component represents gates in the target gate set as bitstrings.

6. The system of claim 1, wherein the multi-qubit tensor product of Pauli matrices acts on a subset of qubits within the quantum circuit without constraints on weight or locality of the Pauli rotations.

7. The system of claim 1, wherein the synthesis component executes the reinforcement learning model on the quantum circuit a plurality of times to optimize a length of the sequence of Pauli rotations.

8. The system of claim 1, wherein the training component trains the reinforcement learning model in two or more difficulty stages.

9. The system of claim 1, wherein the synthesis component iteratively executes the reinforcement learning model on the quantum circuit to iteratively determine a next Pauli rotation and a corresponding gate sequence number.

10. The system of claim 9, wherein the synthesis component executes the reinforcement learning model on the quantum circuit to produce a probability distribution over a set of Pauli rotations, and wherein the synthesis component selects a gate from the set of Pauli rotations with a highest probability in the probability distribution as the next Pauli rotation.

11. The system of claim 10, wherein the synthesis component selects, based on user input, a gate from the set of Pauli rotations by sampling from the probability distribution over the next Pauli rotation.

12. The system of claim 9, wherein the synthesis component executes the reinforcement learning model on the quantum circuit to produce a probability distribution over a set of bits, and wherein the synthesis component selects bits with a probability greater than a defined threshold to encode the next Pauli rotation.

13. The system of claim 5, wherein the synthesis component selects the reinforcement learning model based on the target gate set.

14. A computer-implemented method, comprising:

receiving, by a system operatively coupled to a processor, a quantum circuit;

synthesizing, by the system and via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set; and training, by the system, the reinforcement learning model, wherein training the reinforcement learning model comprises:

applying a penalty for circuit depth; and applying a reward for a correct circuit.

15. The computer-implemented method of claim 14, further comprising:

implementing, by the system, the sequence of Pauli rotations of form exp(ISP) through fault-tolerant logical Pauli measurements in an error correction code.

16. The computer-implemented method of claim 14, further comprising:

iteratively executing, by the system, the reinforcement learning model on the quantum circuit to iteratively determine a next Pauli rotation and a corresponding gate sequence number.

17. The computer-implemented method of claim 16, further comprising:

executing, by the system, the reinforcement learning model on the quantum circuit to generate a probability distribution over a set of Pauli rotations; and selecting, by the system, a gate from the set of Pauli rotations with a highest probability in the probability distribution as the next Pauli rotation.

18. The computer-implemented method of claim 14, further comprising:

training, by the system, the reinforcement learning model in two or more difficulty stages.

19. A computer program product for facilitating artificially intelligent compilation of quantum circuits for quantum computing, the computer program product comprising a non-transitory computer-readable memory having program instructions embodied therewith, the program instructions executable by a processor to cause the processor to:

receive, by the processor, a quantum circuit;

synthesize, by the processor and via a reinforcement learning model, the quantum circuit into a sequence of Pauli rotations of form exp(iθP), where P is a multi-qubit tensor product of Pauli matrices, that is supported by a quantum computing architecture with Pauli rotations as a gate set; and train, by the processor, the reinforcement learning model, wherein training the reinforcement learning model comprises:

applying a penalty for circuit depth; and applying a reward for a correct circuit.

20. The computer program product of claim 19, wherein the program instructions further cause the processor to:

train, by the processor, the reinforcement learning model in two or more difficulty stages.

* * * * *